(12) United States Patent
Okuno et al.

(10) Patent No.: US 9,294,342 B2
(45) Date of Patent: Mar. 22, 2016

(54) NETWORK NODE APPARATUS SYSTEM, APPARATUS, AND METHOD

(75) Inventors: Michitaka Okuno, Kokubunji (JP); Takeki Yazaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 5 days.

(21) Appl. No.: 13/391,424

(22) PCT Filed: Mar. 23, 2011

(86) PCT No.: PCT/JP2011/056928
§ 371 (c)(1),
(2), (4) Date: Feb. 21, 2012

(87) PCT Pub. No.: WO2012/127644
PCT Pub. Date: Sep. 27, 2012

(65) Prior Publication Data
US 2014/0010068 A1    Jan. 9, 2014

(51) Int. Cl.
G01R 31/08 (2006.01)
H04L 12/24 (2006.01)
H04L 12/939 (2013.01)

(52) U.S. Cl.
CPC .......... *H04L 41/0668* (2013.01); *H04L 49/557* (2013.01)

(58) Field of Classification Search
USPC ................................. 370/216, 219, 220, 223
See application file for complete search history.

(56) References Cited

U.S. PATENT DOCUMENTS

| 5,734,659 A | 3/1998 | Mann et al. | |
| 2007/0253328 A1* | 11/2007 | Harper et al. | 370/219 |
| 2010/0039932 A1* | 2/2010 | Wen et al. | 370/217 |

FOREIGN PATENT DOCUMENTS

| JP | 8-214003 A | 8/1996 |
| JP | 2006-352544 A | 12/2006 |
| JP | 2010-218304 A | 9/2010 |
| JP | 2011-40931 A | 2/2011 |

OTHER PUBLICATIONS

Japanese Office Action dated Feb. 24, 2015 (Four (4) pages).
Form PCT/ISA/237 with English Translation (eighteen (18) pages).
(Continued)

*Primary Examiner* — Zewdu A Beyen
(74) *Attorney, Agent, or Firm* — Crowell & Moring LLP

(57) ABSTRACT

Between network node apparatuses that operate as a duplex system, when a failure occurs in an information processing unit of one system, the service is maintained and continued in an information processing unit of the other system without interruption of the service. In a system using an active system network node apparatus 100-1 and a standby system network node apparatus 100-2 both in an operating state, a switch processing unit 110 has a transfer processing unit 112 that copies and transfers a packet flow to be a subject of information processing in the information processing unit 200 to two output destinations, when the switch processing unit operates as an active system. The information processing unit 200 has a mutual monitoring processing unit 203 that checks mutual operating states between the active system and the standby system, determines that a failure has occurred when the active system does not return a response and causes the standby system to operate as an active system, and a halt processing unit that, upon operation as the information processing unit of the standby system, halts output of a packet to be a subject of information processing.

18 Claims, 19 Drawing Sheets

(56) References Cited

OTHER PUBLICATIONS

Shuichi Karino et al., "A Duplicate Redundancy and Packet Processing Method in Router Clusters", Electronic Information Communication Academy Magazine, Oct. 1, 2005, vol. J88-B, No. 10, (fourteen (14) pages).

Hideki Iwasaki, "Constructing a Highly Reliable Web Site by the System Redundancy", N+1 Network, Mar. 1, 2003, vol. 3, No. 3, (eight (8) pages).

Tatsuo Takahashi, "A study of VPN Protocol Over Mobile Communication Network and its Performance Evaluation", Mar. 8, 2002, vol. 2002, No. 24, (ten (10) pages).

\* cited by examiner

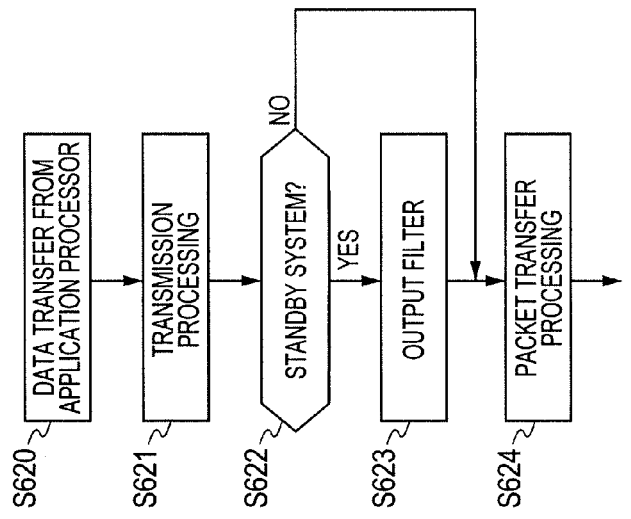

FIG. 17

INPUT FILTER TABLE 400

| SEARCH KEY 401 | PRIORITY 402 |
|---|---|
| ... | |

FIG. 18

OUTPUT FILTER TABLE 410

| SEARCH KEY 411 | PRIORITY 412 |
|---|---|
| ... | |

NETWORK NODE APPARATUS SYSTEM, APPARATUS, AND METHOD

TECHNICAL FIELD

The present invention relates to a communication apparatus and a communication system, and more particularly, to a technique for redundantization of apparatus to continue information processing and communication processing.

BACKGROUND ART

Various techniques exist as background art of a redundant information communication processing system regarding the present technical field. For example, Patent Literature 1 describes, as its object, providing a redundant system of a layer 2 network capable of shortening a non-redundant section of the layer 2 network and switching a path from an active system to a reserve-system in a short time when a failure of the network occurs.

Further, as its solution, there is a description, "In-house Bases A, B of a subscriber are mutually connected via the layer 2 network redundantized by multiplexing of respective switches. The layer 2 network has CSWs 33, 34 duplexed by the active system (m) and the standby system (s), ESWs 32, 35 arranged at a boundary part of the network and M/Cs 31, 36 on the net side which convert a layer 2 frame into an optical signal. The duplexed M/Cs 10, 20 on the subscriber side and port switching devices 11 and 21 which selectively connect either of the active system or the reserve system of each M/C on the subscriber's side with the subscriber terminal are arranged in each of the in-house bases A, B.".

Further, Patent Literature 2 describes, as its object, attaining data synchronization for maintaining a communication service between duplexed structures, while securing correspondence possibility to functional extensions or the independence of each functional module.

Further, as its solution, there is a description, "Provided is a duplexed synchronization control part 500 (500-1, 500-2) mounted as a module which is independent of functional modules 502-1 and 502-2, mounted on the communication control apparatus 600, for performing the notification processing of data as the object of synchronization between a current system and a stand-by system. The duplexed synchronization control part 500 receives the synchronization object data and a notification destination module identifier for identifying a module which is at least the destination of notification as data accessory to the data from the functional module 502-1, operating as the current system, and transfer the received data to the functional module 502-2, operating as a stand-by system, on the basis of the received notification destination module identifier.".

CITATION LIST

Patent Literature

Patent Literature 1: JP-A No. 2006-352544
Patent Literature 2: JP-A No. 2010-218304

SUMMARY OF INVENTION

Technical Problem

In the above-described conventional art, for example, as in the case of the Patent Literature 2, upon system switching of the duplex system, it is necessary to transfer necessary data and the like from the current system to the stand-by system. For this purpose, predetermined time is required.

The object of the present invention is to provide a network node apparatus system, an apparatus, and a method capable of, between network node apparatuses having an information processing unit operating as a duplex system, when a failure occurs in the information processing unit of one system, maintaining and continuing communication processing and information processing service without interruption in the other system.

Solution to Problem

To attain the above-described object, the present invention provides a network node apparatus system, wherein network node apparatuses of an active system and a standby system, having a switch processing unit that performs packet transfer processing and an information processing unit that executes an application, both in an operating state, are used, and wherein the switch processing unit copies and transfers the packet to the information processing unit of the active system and the information processing unit of the standby system.

Further, to attain the above-described object, the present invention provides a network node apparatus which uses an active system and a standby system, both in an operating state, comprising a switch processing unit that performs packet transfer processing, and an information processing unit that executes an application, wherein the switch processing unit has a transfer processing unit that, when the switch processing unit operates as a switch processing unit of the active system, copies and transfers a packet to be a subject of information processing in the information processing unit to two output destinations, and wherein the information processing unit has: a mutual monitoring processing unit that checks mutual operation states between the active system and the standby system, determines that a failure occurs when the information processing unit of the active system does not return a response, and causes the information processing unit of the standby system to operate as the active system; and a halt processing unit that halts packet output from the information processing unit of the standby system by the application when the information processing unit operates as the information processing unit of the standby system.

Further, to attain the above-described object, the present invention provides a communication method for using network node apparatuses of an active system and a standby system, having a switch processing unit that performs packet transfer processing and an information processing unit that executes an application, both in an operating state, wherein when the switch processing unit operates as the switch processing unit of the active system, copies and transfers a packet to be a subject of information processing in the information processing unit to two output destinations, and wherein the information processing unit checks mutual operation states between the information processing unit of the active system and the information processing unit of the standby system, and determines that a failure occurs when the information processing unit of the active system does not return a response, causes the information processing unit of the standby system to operate as the active system, and when operates as the information processing unit of the standby system, halts packet output from the information processing unit of the standby system by the application.

Advantageous Effects of Invention

According to the present invention, between network node apparatuses having an information processing unit operating as a duplex system, even when a failure occurs in the information processing unit of one system, it is possible to maintain and continue communication processing and information processing service without interruption in the other system.

BRIEF DESCRIPTION OF DRAWINGS

FIG. 14 is a diagram showing an example of a flowchart of packet reception processing in the network node, according to the first embodiment.

FIG. 15 is a diagram showing an example of a flowchart of packet transmission processing in the network node, according to the first embodiment.

FIG. 17 is a diagram showing an example of an input filter table, according to a second embodiment.

FIG. 18 is a diagram showing an example of an output filter table, according to the second embodiment.

DESCRIPTION OF EMBODIMENTS

Figure 1:
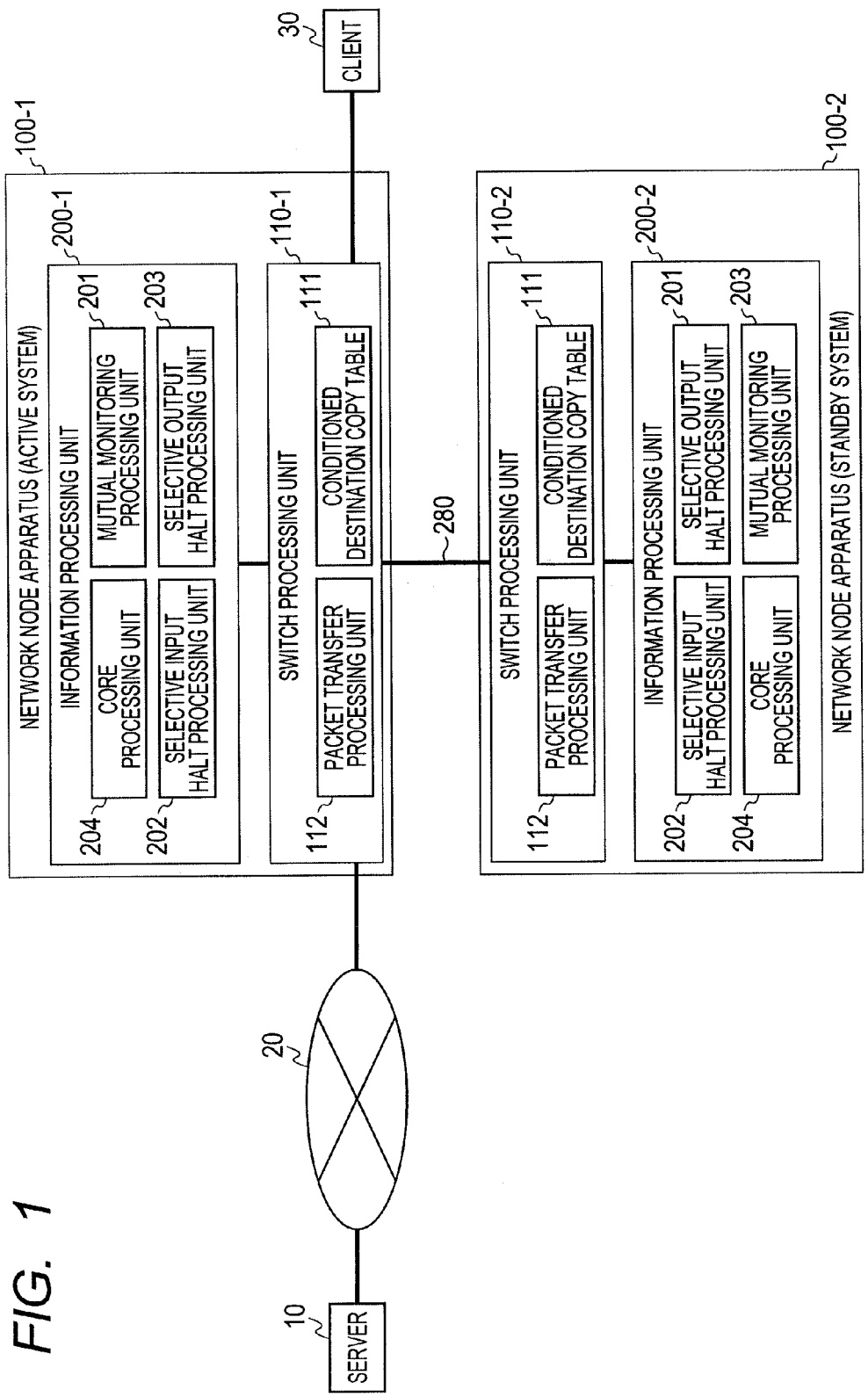
FIG. 1 is a diagram showing an example of basic arrangement of an active system network node and a standby system network node, according to a first embodiment.

Hereinbelow, examples of embodiments of the present invention will be described based on the attached drawings. In the respective drawings, the same reference numeral denotes the identical item or corresponding item. For the sake of convenience of explanation, the reference numerals are distinguished by addition of suffix. Further, in the present specification, the respective functional blocks in a network node apparatus may be referred to as "function", "means", "processing unit" and the like. For example, "mutual monitoring function", "mutual monitoring means", "mutual monitoring processing unit" and the like are given.

Embodiment 1

In a first embodiment, a basic system of an apparatus and a system to, between duplexed structures, even upon occurrence of failure in one system, maintain and continue communication processing and information processing in the other system, will be described.

FIG. 1 is a system configuration diagram showing the embodiment 1, having an active system network node apparatus 100-1, a standby system network node apparatus 100-2, adjacent to the active system network node apparatus 100-1, to realize redundantization thereof, a server 10, a wide area network (WAN) 20, and a client 30.

The network node apparatus 100 has a switch processing unit 110 to perform packet transfer and an information processing unit 200 to perform layer 4 or higher layer information processing. The switch processing unit 110 has, in addition to a packet transfer processing unit 112, a conditioned destination copy table 111 to be described later as a characteristic function of the present embodiment. Further, the information processing unit 200 has, in addition to a core processing unit 204 to perform information processing, a mutual monitoring processing unit 201, a selective input halt processing unit 202, a selective output halt processing unit 203 to be described later, characteristic of the present embodiment.

Figure 2:
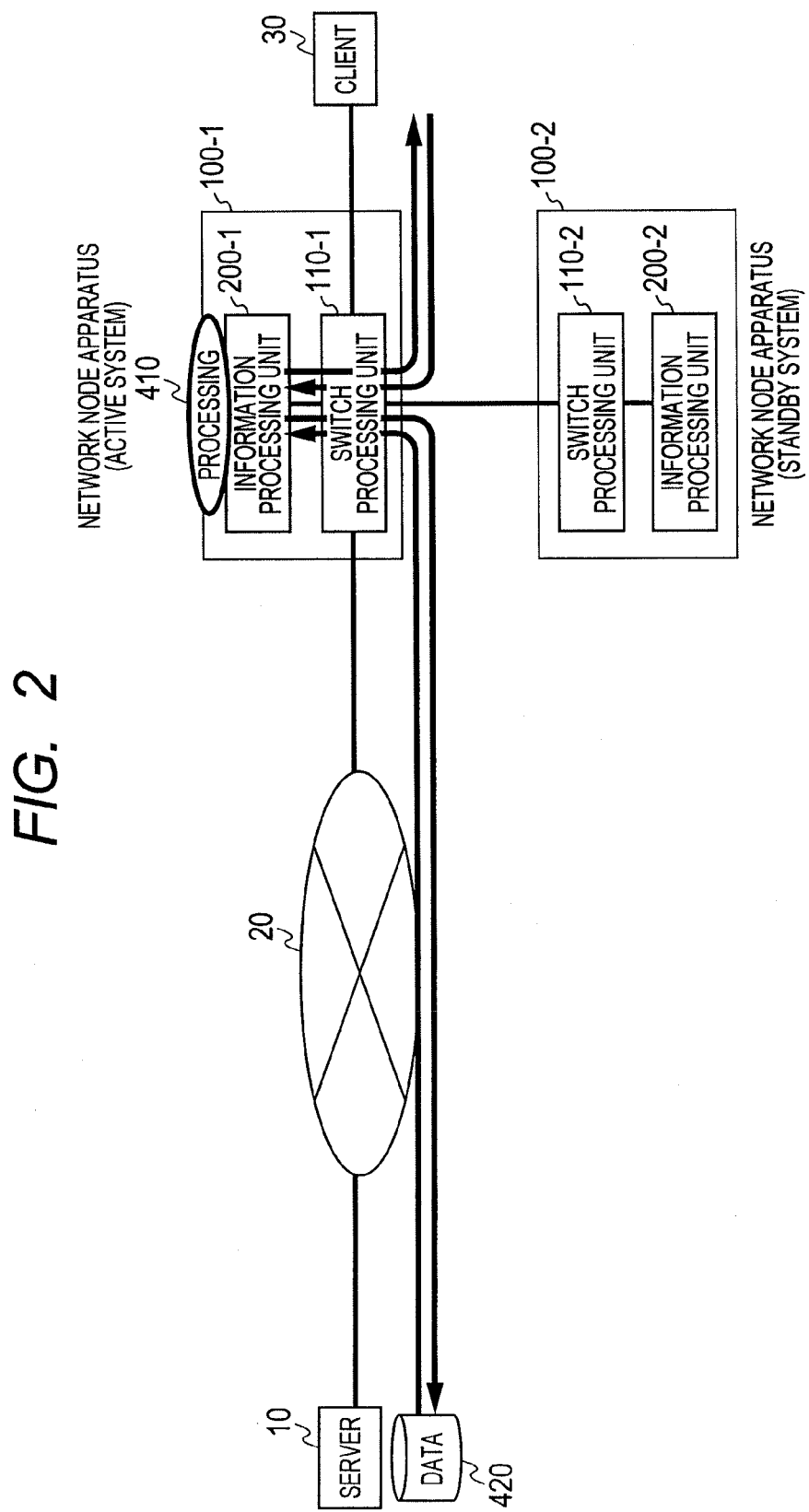
FIG. 2 is a diagram showing an example of information processing in the active system network node, according to the first embodiment.

FIG. 2 shows an example of information processing in the information processing unit 200 of the active system network node 100-1 in the present embodiment. In the present embodiment, the client 30 at a base accesses the server 10 in a data center via the WAN 20, and provided with an information processing service using a database 420 on the server 10. When the client 30 and the server 10 are placed in, for example, Japan and the west coast of America, the communication delay is very low, 200 ms, and the communication performance of corresponding information processing is degraded. As a result, a problem of reduction of the response speed of the information processing service itself occurs.

To address this problem, a model to perform processing 410 with the network node apparatus 100 having an information processing function capable of information processing in the vicinity of the client 30 can be considered. At this time, the database 420 itself is huge and it is generally difficult and inefficient to arrange all of it in the network node apparatus 100. Accordingly, a model to perform information processing while transferring only data utilized in the corresponding processing 410 to the information processing unit 200 of the network node apparatus 100 is assumed in the system of the present embodiment.

With the above-described processing, it is possible to reduce the information processing time viewed from the client 30. However, when a failure occurs in the information processing unit 200 which performs the information processing in the network node apparatus 100, communication processing and information processing of the corresponding information processing service halt. Accordingly, the system of the present embodiment provides a means for, by using the active system network node apparatus 100-1 and its adjacent standby system network node apparatus 100-2, even occurrence of a failure in the information processing unit 200-1 of the active system network node apparatus 100-1, continuing the corresponding information processing service with the information processing unit 200-2 of the standby system network node apparatus 100-2. Hereinbelow, its details will be described.

First, the switch processing unit 110 of the network node apparatus 100 will be described. As shown in FIG. 1, the switch processing unit 110 has the packet transfer processing unit 112 provided in a general packet transfer device, an unshown network interface, and various transfer tables such as a routing table. The processing unit refers to the transfer tables, and transfers packet transfer based on, for example, packet header information such as a destination IP (Internet Protocol) address and a destination MAC (Media Access Control) address. Further, as a transfer table characteristic of the system of the present embodiment, the processing unit has the conditioned destination copy table 111 shown in FIG. 1. Note that in the present specification, in some cases, the conditioned destination copy table 111 and the packet transfer processing unit 112 are referred to as a transfer processing unit.

Figure 5:
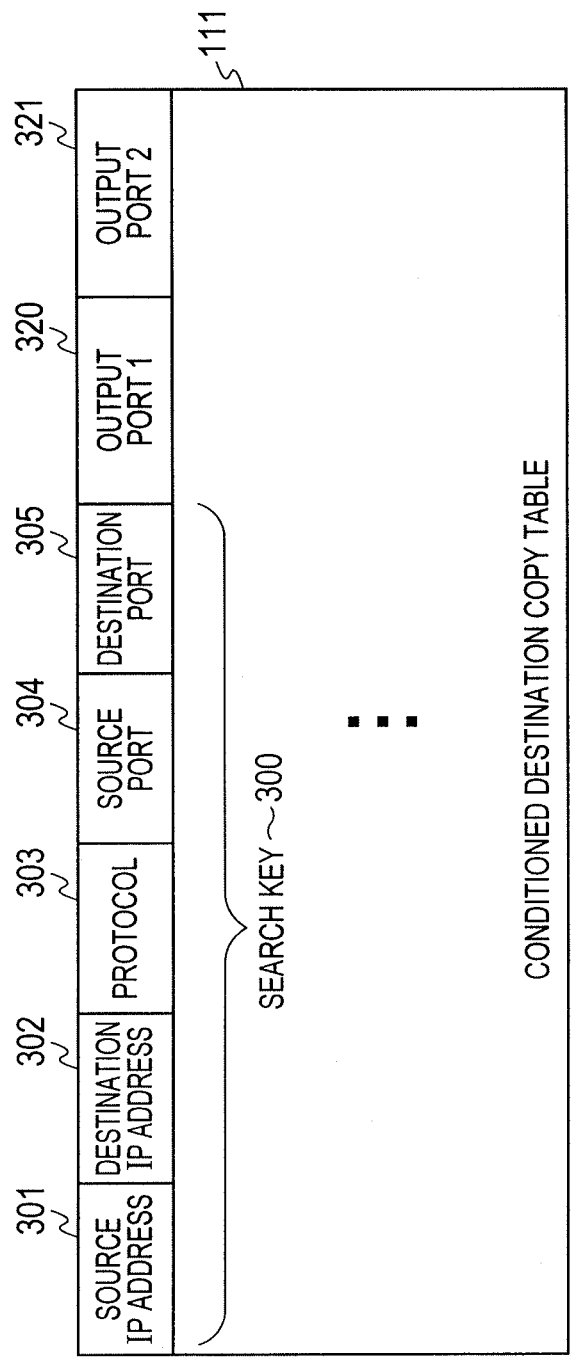
FIG. 5 is a diagram showing an example of a conditioned destination copy table, according to the first embodiment.

The conditioned destination copy table 111, as its details shown in FIG. 5, has at least a field of a search key 300 and fields of an output port 1 320 and an output port 2 321. For example, the search key 300 is 5 tuple information indicated with an source IP address 301, a destination IP address 302, a protocol 303, an source port 304, a destination port 305. Further, the search key may be a VLAN ID (Virtual Local Area Network Identifier) or arbitrary header information. The flow of a packet corresponding with the present search key forcibly copies and transfers the packet to an output destination of the present network node apparatus indicated with the output port 1 320 and the output port 2 321, independently of original destination IP address and destination MAC address.

Note that packet copying with the conditioned destination copy table 111 is similar to a port mirroring function of a general switch device or the like in the point of copying packet content to an output port. However, the packet copying in the present embodiment is different in the point that packet input from an opposite direction is allowed. Generally, the port mirroring is made for the purpose of connecting a measuring device such as a network analyzer to a port to receive a copied packet for traffic measurement. In the present embodiment, for example, when packet copy transmission is performed with the active system switch processing unit 110-1 via a line 280 to the standby system switch 110-2, the standby system switch 110-2 can perform packet transfer using the same line 280 to the active system switch 110-1.

Figure 21:
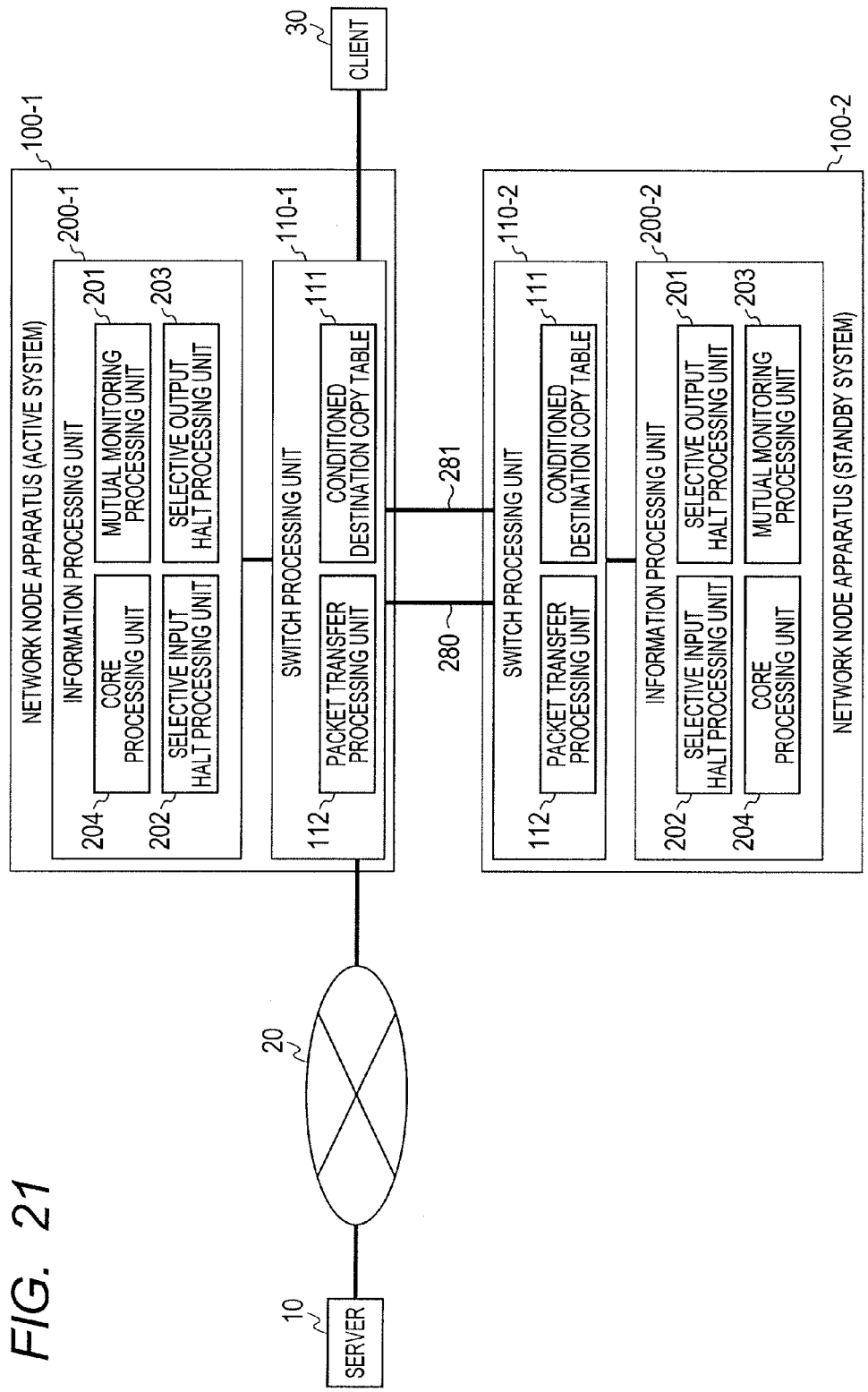
FIG. 21 is a diagram showing a modification of connection between the active system network node and the standby system network node with two lines, according to the first embodiment.

Note that implementation to obtain a similar effect to that by the structure of the present embodiment while using the port mirroring function is possible. In this case, as shown in FIG. 21, the line 280 and line 281 are provided. Then, the active system switch 110-1, with the transfer to the information processing unit 200-1 as original transfer, transfers a copied packet via the line 280 to the standby system switch 110-2 using the port mirroring function. Then, transfer from the standby system switch 110-2 to the active system switch 110-1 may be performed by using the line 281.

In a modification in FIG. 21, two lines, the line 280 and the line 281, are provided, however, the number of lines may be further increased. For example, four lines, a line to transfer a packet to be transmitted/received to/from the client side network to the standby system switch 110-2, a line to return from the switch 110-2 to the switch 110-1, a line to transfer a packet to be transmitted/received to/from the server side network to the standby system switch 110-2, and a line to return from the switch 110-2 to the switch 110-1, may be provided. Further, a line for general data to transmit/receive a packet to/from the server or client, and a line for control to transmit/receive a packet, specialized for a state notification packet (heart beat) to be described later, may be provided.

By designating the active system information processing unit 200-1 as the output port 1 320 of the above-described conditioned destination copy table 111 and designating the standby system network node apparatus 100-2 as an output port 2 321, it is possible to transfer the corresponding packet flow to the active system information processing unit 200-1 and the standby system network node apparatus 100-2. In the standby system network node apparatus 100-2, the packet flow is transferred to the information processing unit 200-2 with the packet transfer processing unit 112 of the switch processing unit 110-2. As a result, the corresponding packet flow is received and processed with both of the active system information processing unit 200-1 and the standby system information processing unit 200-2.

Note that only one of the output port 1 320 and the output port 2 321 may be used. In this case, the packet is transferred to only the designated port. As described above, the configuration of the switch processing unit 110 of the network node apparatus 100 has been described.

Next, the configuration of the information processing unit 200 of the network node apparatus 100 will be described using FIG. 3. The information processing unit 200 has, as previously described using FIG. 1, the mutual monitoring processing unit 201 to perform state notification, failure detection and system switching processing between the active system and the standby system, the selective input halt processing unit 202 to perform control to selectively read an input packet flow, and the selective output halt processing unit 203 to perform control to selectively halt an output packet flow. Note that in the present specification, in some cases, the selective input halt processing unit 202 and the selective output halt processing unit 203 are referred to as a halt processing unit. The element described as the core processing unit 204 to perform information processing in FIG. 1 corresponds to other element than the above-described three constituent elements in various function blocks in FIG. 3.

An input director 205 performs processing to direct an input packet to an A-side input filter 210, a B-side input filter 220, a pass-through processing unit 250, or the mutual monitoring processing unit 201. In the embodiment 1, the input director directs a packet, which is processed with an application processing unit 240 to be described later and which flows from the server 10 side toward the client 30 side, to the A-side input filter 210; a packet, which flows from the client 30 side toward the server 10 side, to the B-side input filter. Further, the input director directs a packet from the mutual monitoring processing unit 201 outside the present system to the mutual monitoring processing unit 201 of the present system, and directs other packets to the pass-through processing unit 250.

An output merge unit 206 performs processing to transmit a packet from the A-side output filter 216, the B-side output filter 226, the mutual monitoring processing unit 201 and the pass-through processing unit 250 to the outside of the information processing unit.

The selective input halt processing unit 202 performs processing to filter, i.e., halt (eliminate) reading of particular packet flow using the A-side input filter 210 and the B-side input filter 220. Note that in the embodiment 1, the active system information processing unit 200-1 and the standby system information processing unit 200-2 read all the packet flows inputted into the A-side input filter 210 and B-side input filter 220 without filtering. An example of partial filtering will be described in an embodiment 2.

When the selective output halt processing unit 203 operates as the standby system information processing unit 200-2, it performs processing to filter, i.e., halt packet output to the server 10 and the client 30 using the A-side output filter 216 and the B-side output filter 226. Similarly, the selective output halt processing unit performs processing to halt packet output with respect to the pass-through processing unit 250. Further, when a failure occurs in the active system information processing unit 200-1 and the standby system information processing unit 200-2 operates as an active system, the selective output halt processing unit releases the above-described filter. That is, the selective output halt processing unit allows the packet output halted by that time.

The pass-through processing unit 250 transfers the packet inputted from the input director 205, without any processing, toward the output merge unit 206. Note that when the switch processing unit 110 is set not to transfer a packet flow not requiring processing with an application processing unit 240 of the information processing unit 200 to the information processing unit 200, basically the packet is not transferred to the pass-through processing unit 250.

An A-side reordering unit 211, an A-side retransmission processing unit 213 and an A-side transmission processing unit 215 are constituent elements of an A-side response acknowledgement type communication protocol processing unit. Note that the response acknowledgment type communication protocol means, for example, a communication protocol to perform data transmission acknowledgement such as TCP (Transmission Control Protocol), and the response acknowledgement type communication protocol processing unit means a functional unit to perform the protocol.

When the input packet from the A-side input filter 210 is a data packet, it is received with the A-side reordering unit 211, and the above-described data packet is written into an A-side receive buffer 212. The A-side reordering unit 211 checks whether or not the above-described data packet has arrived in a sequential order on the basis of the sequence numbers or the like. When a missing packet is found, the processing unit transmits a response packet to perform retransmission request for the corresponding packet, from an A-side transmission processing unit 215. Further, when the packet was in a sequential order, the processing unit transmits a response packet to notify normal arrival, from the A-side transmission processing unit 215. Note that the A-side transmission processing unit 215 performs, in addition to the processing for the A-side reordering unit 211 as described above, processing to transmit data, written with the application processing unit 240 into an A-side transmission buffer 214, as a data packet.

When the input packet from the A-side input filter 210 is a response packet, it is received with an A-side retransmission processing unit 213. When the A-side retransmission processing unit 213 receives a response packet indicating normal arrival, it deletes the corresponding data from the A-side transmission buffer 214. When the processing unit receives a response packet indicating retransmission request, it retransmits the corresponding data from the A-side transmission buffer 214.

Regarding the B-side input filter 220, a B-side output filter 226, a B-side reordering unit 221, a B-side retransmission processing unit 223, a B-side transmission processing unit 225, a B-side receive buffer 222 and a B-side transmission buffer 224, similar processing to that on the A side is performed only except the packet flow direction. The B-side reordering unit 221, the B-side retransmission processing unit 223 and the B-side transmission processing unit 225 are referred to as a response acknowledgement type communication protocol processing unit, and used as a functional unit to perform response acknowledgement type communication protocol.

The application processing unit 240 receives data used by an application via the A-side receive buffer 212 and the B-side receive buffer 222. The application processing unit performs programmed communication processing and information processing, and writes the result into the A-side transmission buffer 214 on the opposite side to the input, and the B-side transmission buffer 224.

Figure 6:
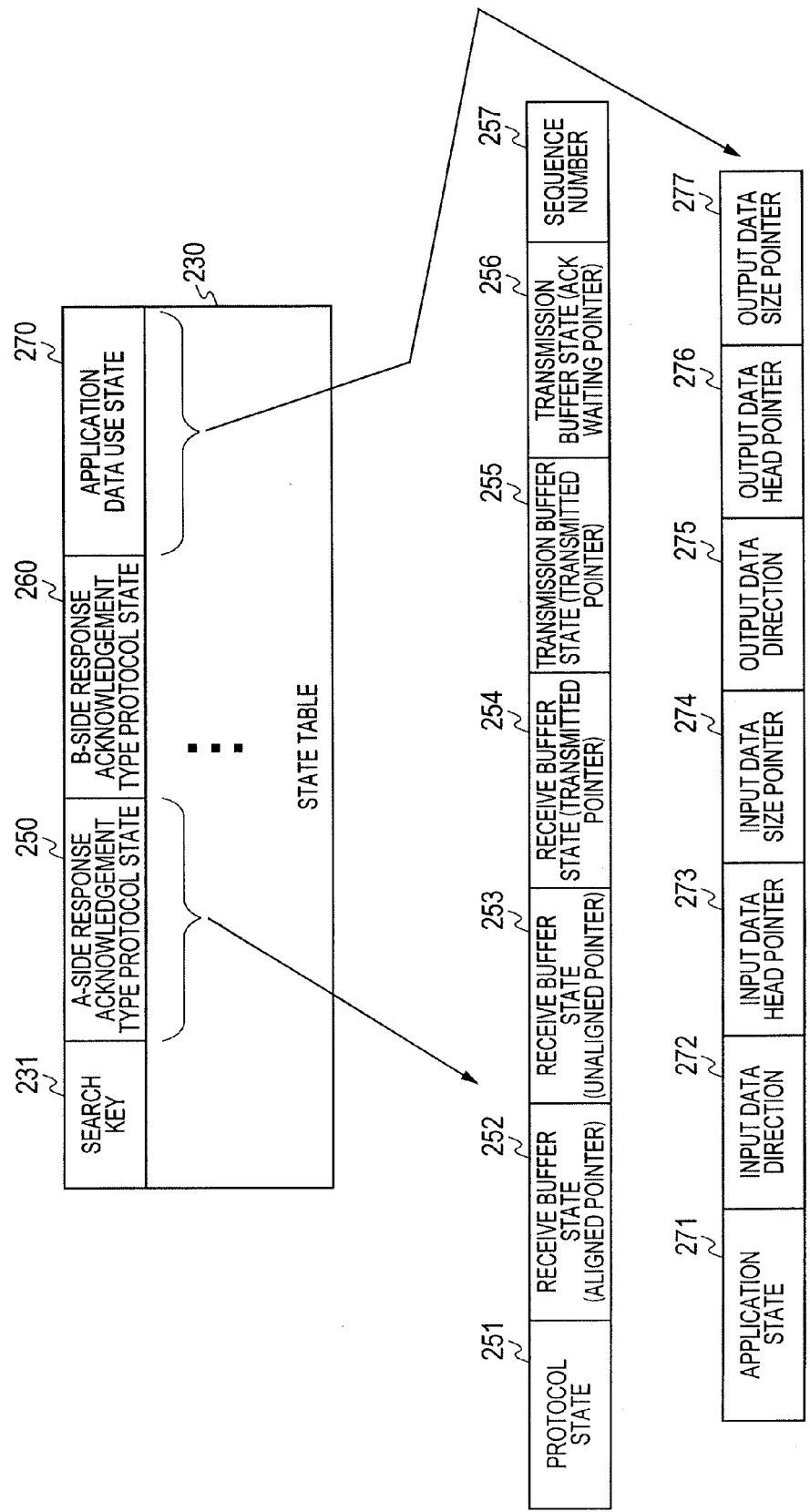
FIG. 6 is a diagram showing an example of a state table, according to the first embodiment.

A state table 230 has, as its example is shown in FIG. 6, a search key 231, an A-side response acknowledgement type protocol state 250, a B-side response acknowledgement type protocol state 260, an application data use state 270 and the like.

The A-side response acknowledgement type protocol state 250 has, for example, a protocol state 251 indicating a connection state (established, connected, terminating and the like), a receive buffer aligned pointer 252, a receive buffer unaligned pointer 253, a receive buffer transmitted (to the application processing unit side) pointer 254, a transmission buffer transmitted (to outsider) pointer 255, a transmission buffer response (ACK) waiting pointer 256, a sequence number 257 and the like.

The sequence number 257 can be used not only for the purpose of checking a current packet flow sequence number but for the purpose of, in communication processing from the A-side to the B-side or inverse direction, obtaining the same packet sequence number value from the active system and standby system transmission processing units. When a failure occurs in the active system information processing unit 200-1 and output from the standby system information processing unit 200-2 is validated, this is necessary processing to enable the standby system information processing unit 200-2 to use the same sequence number as the sequence number of the packet flow used with the active system information processing unit 200-1 as a reference.

By using the sequence number 257, the opposite-side response acknowledgement type protocol may use the transferred sequence number itself, or may use a new sequence number obtained by adding/subtracting a certain value to/from the sequence number. When the certain value is added/subtracted, the active system information processing unit 200-1 and the standby system information processing unit 200-2 use the same certain value.

The B-side response acknowledgement type protocol state 260 is similar to the A-side response acknowledgement type protocol state 250. Further, the application data use state 270, depending on application, has, for example, an application state 271 (working, suspended, data waiting state and the like), an input data direction 272 from response acknowledgement type protocol, an input data head pointer 273, a pointer 274 to obtain input data size information, an output data direction 275 to the response acknowledgement type protocol, an output data head pointer 276, a pointer 277 to obtain output data size information, and the like.

Figure 4:
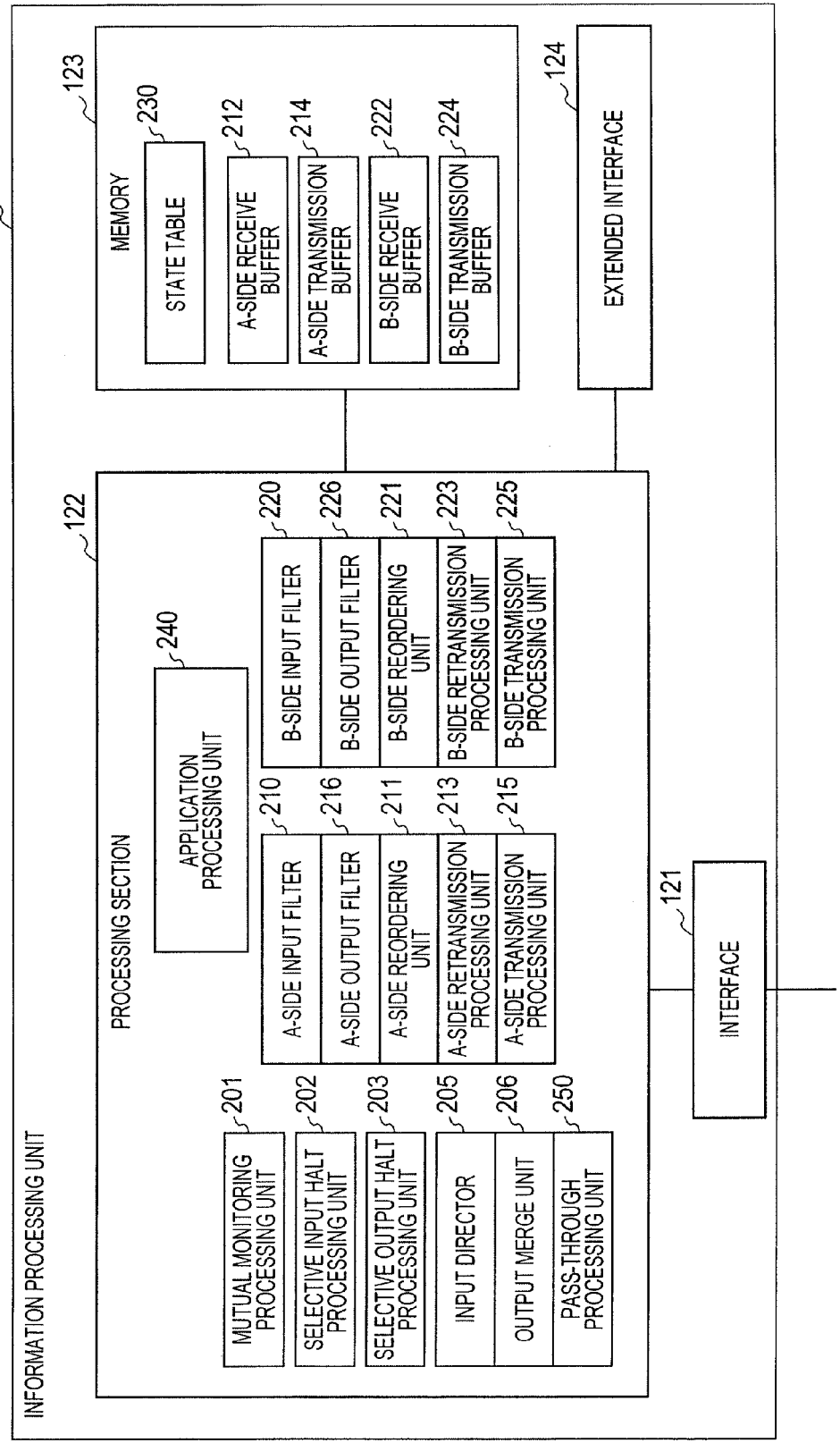
FIG. 4 is a diagram showing an example when the information processing unit, according to the first embodiment has a processing unit and a memory.

Note that the information processing unit 200 in the present embodiment may be formed with specialized hardware, however, as shown in FIG. 4, may be formed with a processing section 122 using a general processor to function as a processing unit, a network processor or the like, a memory 123 as a storage, an extended interface 124 for connection with other devices, and an interface 121 for connection with the switch processing unit 110 main body.

In this case, the processing section 122 executes a program to simulate the mutual monitoring processing unit 201, the selective input halt processing unit 202, the selective output halt processing unit 203, the input director 205, the output merge unit 206, the A-side input filter 210, the A-side output filter 216, the A-side reordering unit 211, the A-side retransmission processing unit 213, the A-side transmission processing unit 215, the B-side input filter 220, the B-side output filter 226, the B-side reordering unit 221, the B-side retransmission processing unit 223, the B-side transmission processing unit 225, the pass-through processing unit 250 and the application processing unit 240. Further, on the memory 123, the state table 230, the A-side receive buffer 212, the A-side transmission buffer 214, the B-side receive buffer 222 and the B-side transmission buffer 224 are stored, and used from the processing section 122. The configuration of the information processing unit 200 of the network node apparatus 100 has been described as above.

Next, packet reception processing in the network node apparatus 100 in the present embodiment will be described using FIG. 14. In the present embodiment, it is presumed that the active system information processing unit 200-1 and the standby system information processing unit 200-2 are both in an operating state. That is, the standby system, not in a called standby state but in a hot standby state, can immediately continue processing upon occurrence of failure in the active system information processing unit 200-1. The network node apparatus 100 which has received a packet performs inspection as to whether or not the packet is a subject of information processing by the switch processing unit 110 (S601→S602). When the packet is not a subject of information processing, normal packet transfer processing is performed (S611).

When the packet is a subject of information processing, in the case of the active system network node apparatus 100-1, copy-transmission is performed toward the active system information processing unit 200-1 and the standby system network node apparatus 100-2 independently of the destination IP address and the destination MAC address of the packet (S603→6604). On the other hand, in the case of the standby system network node apparatus 100-2, the packet is transmitted to the information processing unit 200-2 (S603→S605).

When the information processing unit 200 receives the packet to be a subject of information processing, inputs the packet in the response acknowledgement type communication protocol via the input director 205 and the output filter 210 (220). The packet is written into the receive buffer 212 (222), then, when the packet is a data packet, the reordering unit 211 (221) performs reordering (S606). As response processing, on the basis of the sequence number or the like included in the header of the data packet, a response packet indicating, when the data packet has arrived in a sequential order, normal arrival, is returned. When the packet is not in a sequential order, a response packet notifying a retransmission request is returned (S607). Further, when the packet is a response packet indicating a retransmission request, a packet of corresponding data is retransmitted from the transmission buffer 214 (224). Otherwise, as response processing, the corresponding data is deleted from the transmission buffer 214 (224) (S606).

In any way, the response packet or data packet is transmitted by the response processing S607. At this time, in the case of the standby system, the output of the above-described response packet or data packet is filtered with the output filter 216 (226) and is not outputted to the outside (S608→S609). Only in the case of the active system, the packet is outputted to the outside as in the case of processing at normal times.

Further, when a data packet has been received, the data is transferred via the receive buffer 212 (222) to the application processing unit 240 (S610).

Next, packet transmission processing in the network node in the present embodiment will be described using FIG. 15. The transmission processing unit 215 (225) in the response acknowledgement type communication protocol which has received data via the transmission buffer 214 (224) from the application processing unit 240 data-packetizes the data and performs transmission processing (S620→S621).

At this time, in the case of the standby system, the output of the above-described data packet output is filtered with the output filter 216 (226), and is not outputted to the outside (S622→S623). Only in the case of the active system, the data packet is outputted to the outside as in the case of processing at normal times. The switch processing unit 110, which has received the data packet, transfers the packet by the packet transfer processing unit 112 in accordance with the destination described in a routing table or the like (S624).

Next, failure detection and system switching processing in the network node in the present embodiment will be described using FIG. 16. When the information processing unit 200-1 of the active system network node apparatus 100-1 is in the operating state as an active system, it uses the mutual monitoring processing unit 201 to transmit a state notification packet toward the information processing unit 200-2 of the standby system network node apparatus 100-2 (heartbeat) (S630→S631). Hereinafter, by elapse of designated period set with respect to the mutual monitoring processing unit 201, the state notification packet (heartbeat) is continuously transmitted to the information processing unit 200-2 of the standby system network node apparatus 100-2 (repetition of S632→S631).

When the information processing unit 200-2 of the standby system network node apparatus 100-2 is in the operating state as a standby system, it uses the mutual monitoring processing unit 201 to monitor the presence/absence of the state notification packet (heartbeat) from the active system network node apparatus 100-1. When the above-described state notification packet has been received within the designated period set with respect to the mutual monitoring processing unit 201, the monitoring of the presence/absence of the packet is continued (S641).

When the above-described state notification packet has not been received, a state acknowledgement notification is transmitted toward the mutual monitoring processing unit 201 of the active system network node apparatus 100-1 (S641→S642). When a corresponding response is returned from the mutual monitoring processing unit 201 of the active system network node apparatus 100-1, as the information processing unit 200-1 of the active system network node apparatus 100-1 operates, the process returns to the state at S641, to continue the operation as a standby system (S643→S641).

When a corresponding response is not returned from the mutual monitoring processing unit 201 of the active system network node apparatus 100-1, is it determined that the information processing unit 200-1 of the active system network node apparatus 100-1 is at a halt. The selective output halt processing unit 201 of the standby system information processing unit 200-2 releases the packet output halt with the filter of the output filter 216 (226) (S643→S644), to start the operation as an active system (S645).

By the above processing, the feature of the present embodiment is that, upon occurrence of a failure in the active system information processing unit 200-1, the standby system information processing unit 200-2 can continue corresponding information processing and communication processing without changing processing content in the active system switch processing unit 110-1 and the standby system switch processing unit 110-2. For example, upon assumption, rewriting of the IP address of the information processing unit 200 or the like is unnecessary.

Figure 7:
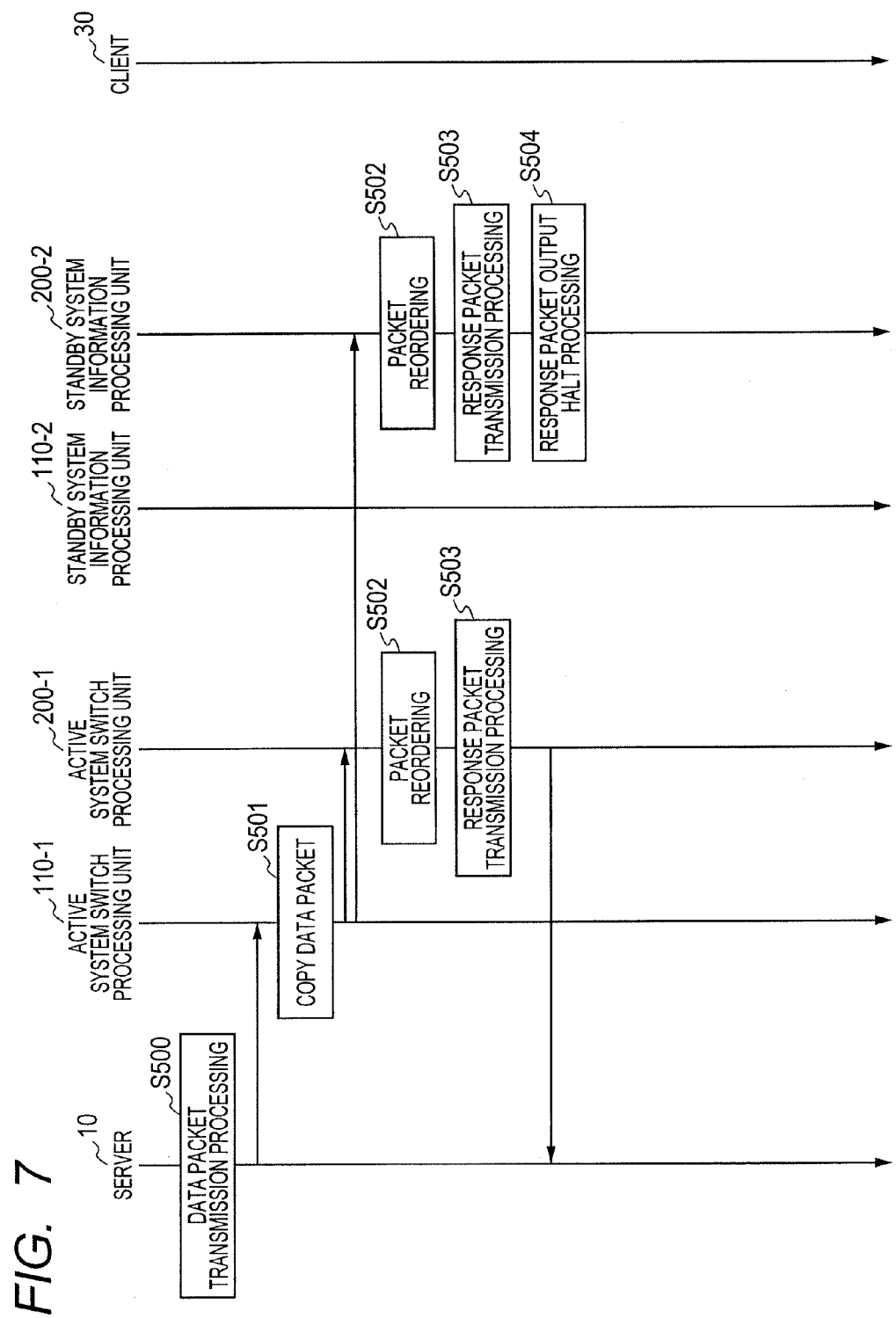
FIG. 7 is a diagram showing an example of a flowchart of communication processing between a server and a network node, according to the first embodiment.
Figure 8:
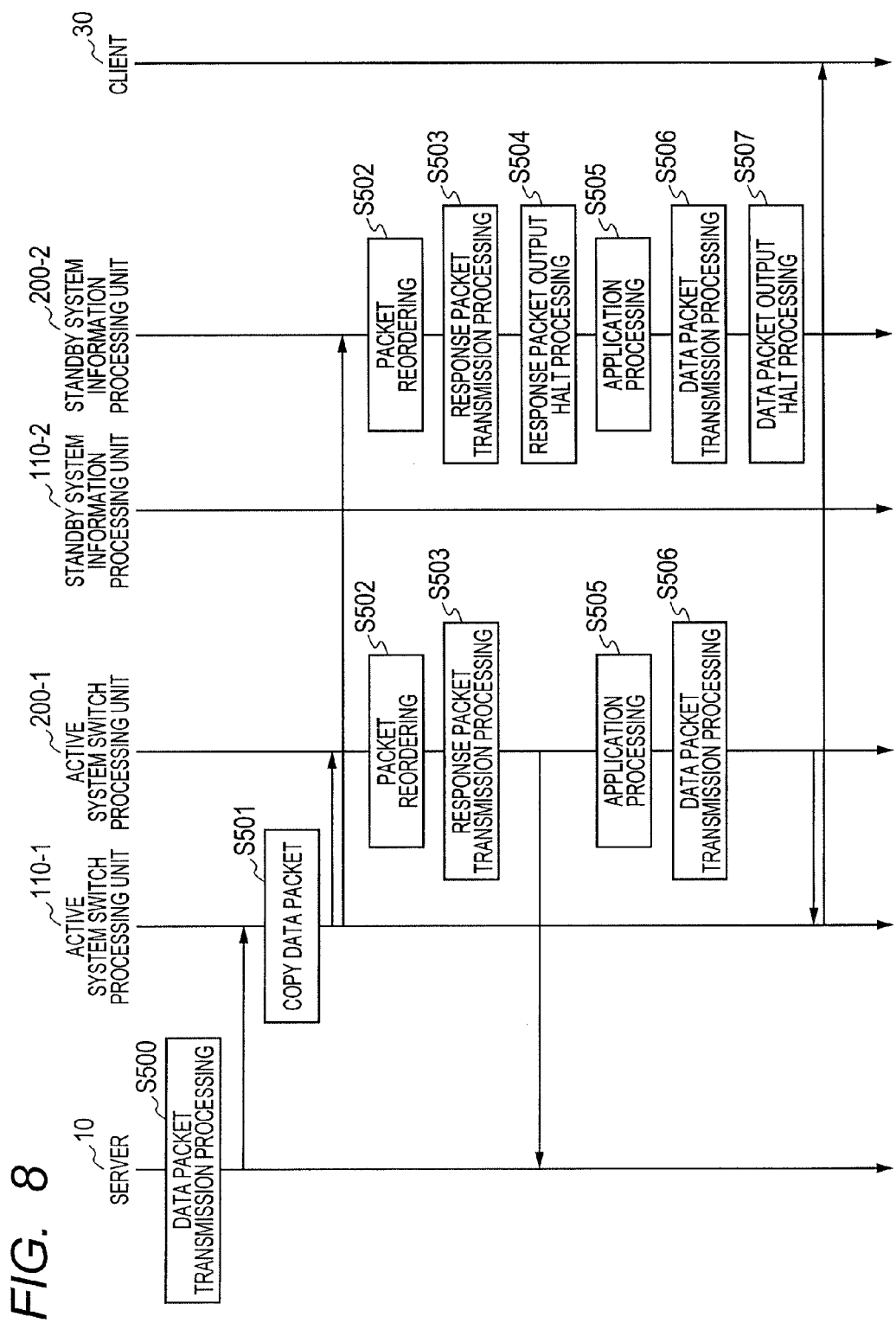
FIG. 8 is a diagram showing an example of a flowchart of communication processing among the server, the network node and a client, according to the first embodiment.
Figure 9:
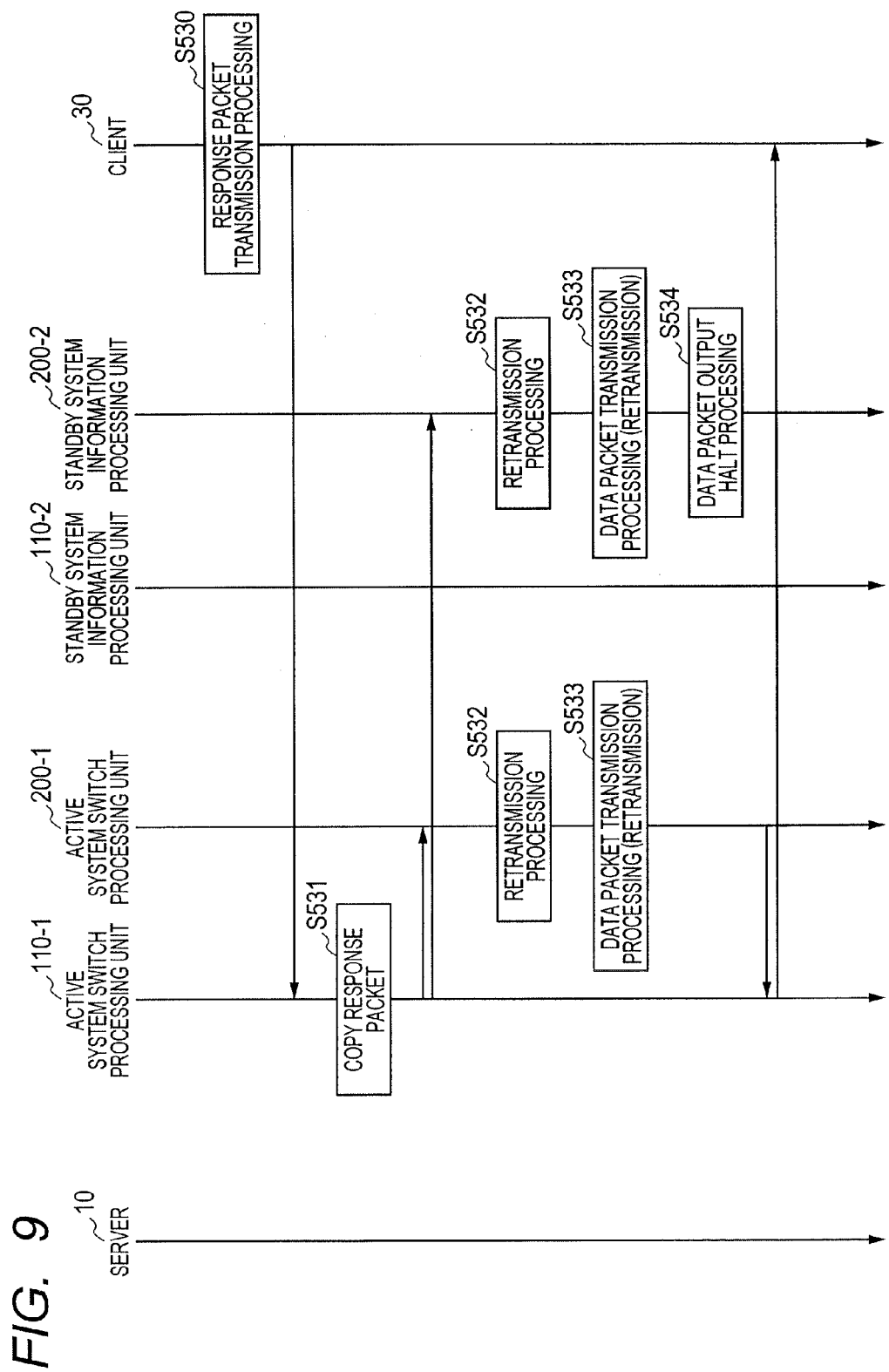
FIG. 9 is a diagram showing an example of a flowchart of communication processing between the network node and the client, according to the first embodiment.

Next, a cooperative operation between the active system network node apparatus 100-1 and the standby system network node apparatus 100-2 when no failure occurs will be described using FIG. 7, FIG. 8 and FIG. 9.

First, communication processing between the server and the network node in the present embodiment will be described using FIG. 7. The server 10, after the establishment of connection with the client 30, transmits a data packet to the client 30 (S500). As long as it is a communication data packet as a subject of information processing, the active system network node apparatus 100-1 at some midpoint on the line copies the data packet and transfers it toward the information processing unit 200-1 of the apparatus itself and the standby system network node apparatus 100-2 using the conditioned destination copy table 111 of the switch processing unit 110-1, independently of the destination IP address and the destination MAC address described in the data packet (S501).

The active system information processing unit 200-1 and the standby system information processing unit 200-2 which have received the above-described data packet perform the previously described data packet reordering (S502). When it is determined on the basis of the sequence number or the like that the data packet has not arrived in a sequential order, response packet transmission processing for retransmission request is performed (S503). At this time, in the standby system information processing unit 200-2, as the output of the above-described packet is halted and is not outputted to the outside (S504) by the processing provided with the selective output halt processing unit 203 and the output filter 216 (226), only a response packet from the active system is transmitted toward the server 10.

Communication processing among the server 10, the network node apparatus 100 and the client 30 regarding a case where it is determined on the basis of the sequence number or the like that the data packet has arrived in a sequential order, in the above-described packet reordering, will be described using FIG. 8. In FIG. 8, the operation to the above-described packet reordering S502 is the same as that in FIG. 7.

When it is determined on the basis of the sequence number or the like included in the header of the packet that the data packet has arrived in a sequential order, the active system information processing unit 200-1 and the standby system information processing unit 200-2 perform response packet transmission processing to notify appropriate data packet reception (S503). At this time, in the standby system information processing unit 200-2, the output of the above-described response packet is halted and is not outputted to the outside by the processing provided with the selective output halt processing unit 203 and the output filter 216 (226) (S504). Thereafter, the active system information processing unit 200-1 and the standby system information processing unit 200-2 transfer the data to the application processing unit 240 via the receive buffer 212 (222), to perform application processing (S505).

The data after the application processing is subjected to transmission processing as a data packet via the transmission buffer 224 (214) in the opposite direction to the reception (S506). At this time, in the standby system information processing unit 200-2, as the output of the above-described data packet is halted and is not outputted to the outside by the processing provided with the selective output halt processing unit 203 and the output filter 226 (216) (S507), only the data packet from the active system is transmitted toward the client 30.

Next, communication processing for response to the data packet transmitted toward the client 30 in FIG. 8 will be described using FIG. 9. The client 30 which has received the data packet transmits a response packet toward the active system network node apparatus 100-1 (S530). The active system network node apparatus 100-1 which has received the above-described response packet copies the response packet and transfers it toward the information processing unit 200-1 of the apparatus itself and the standby system network node apparatus 100-2 using the switch processing unit 110-1, independently of the destination IP address and the destination MAC address described in the response packet (S531).

When the above-described response packet is a retransmission request, the active system information processing unit 200-1 and the standby system information processing unit 200-2 perform retransmission processing to send the corresponding data packet, so as to transmit the data packet toward the client 30 again (S532→S533). At this time, in the standby system information processing unit 200-2, as the output of the above-described data packet is halted and is not outputted to the outside (S534) by the processing provided with the selective output halt processing unit 203 and the output filter 226 (216), only the data packet from the active system is transmitted toward the client 30.

When the above-described response packet is a response packet notifying appropriate data packet reception, the active system information processing unit 200-1 and the standby system information processing unit 200-2 do not perform the retransmission processing S532 but perform deletion of the corresponding data packet from the transmission buffer 224 (214). As described above, the cooperative operation between the active system network node apparatus 100-1 and the standby system network node apparatus 100-2 when a failure does not occur has been described.

Figure 10:
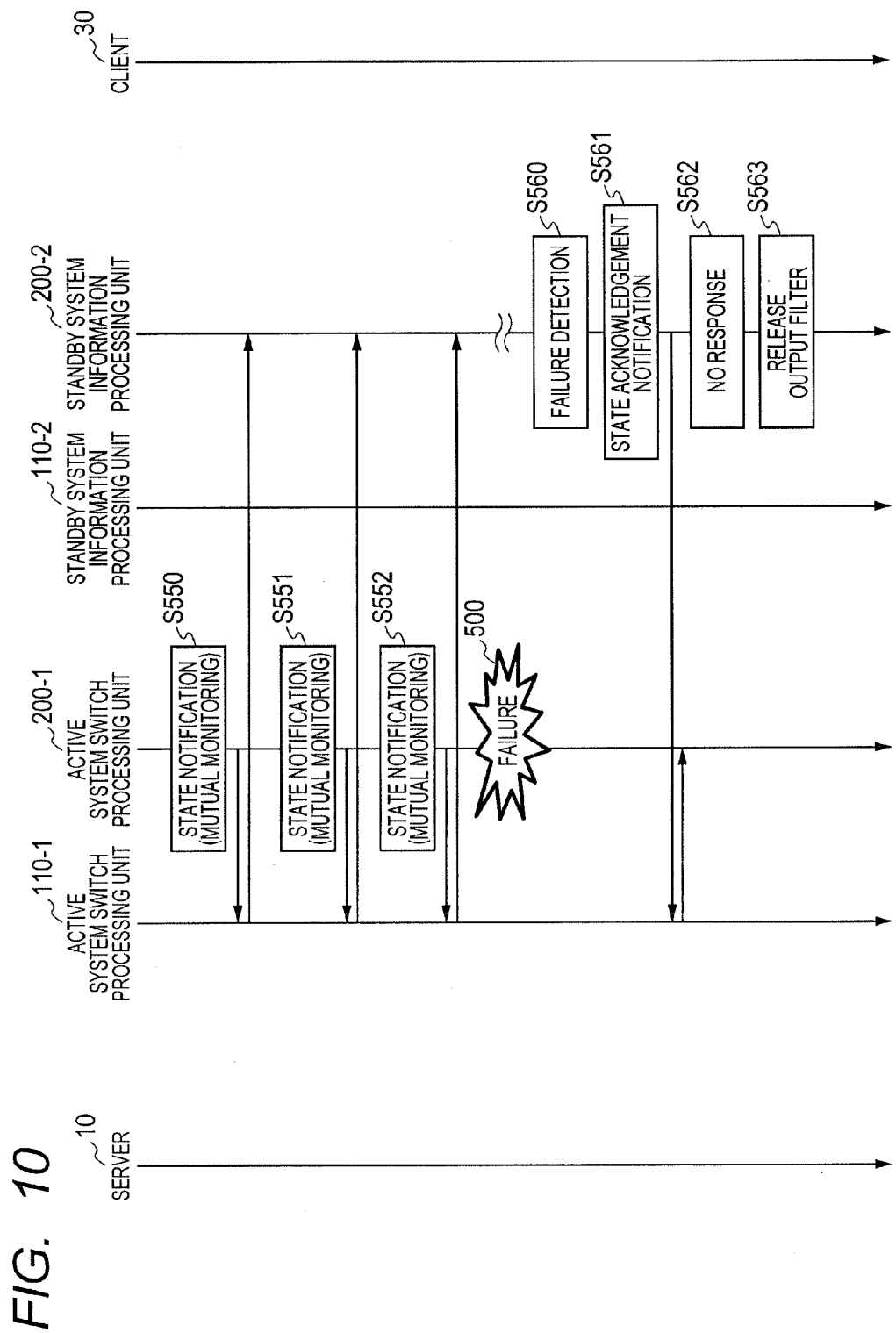
FIG. 10 is a diagram showing an example of a flowchart from failure detection to system switching, according to the first embodiment.

Next, a cooperative operation for failure detection to system switching between the information processing unit 200-1 of the active system network node apparatus 100-1 and the information processing unit 200-2 of the standby system network node apparatus 100-2 will be described using FIG. 10.

When the information processing unit 200-1 of the active system network node apparatus 100-1 is in the operating state, it continues an operation to transmit a state notification packet indicating that it is in the operating state to the information processing unit 200-2 of the standby system the network node apparatus 100-2 (heartbeat) (S550→S551→S552).

Figure 16:
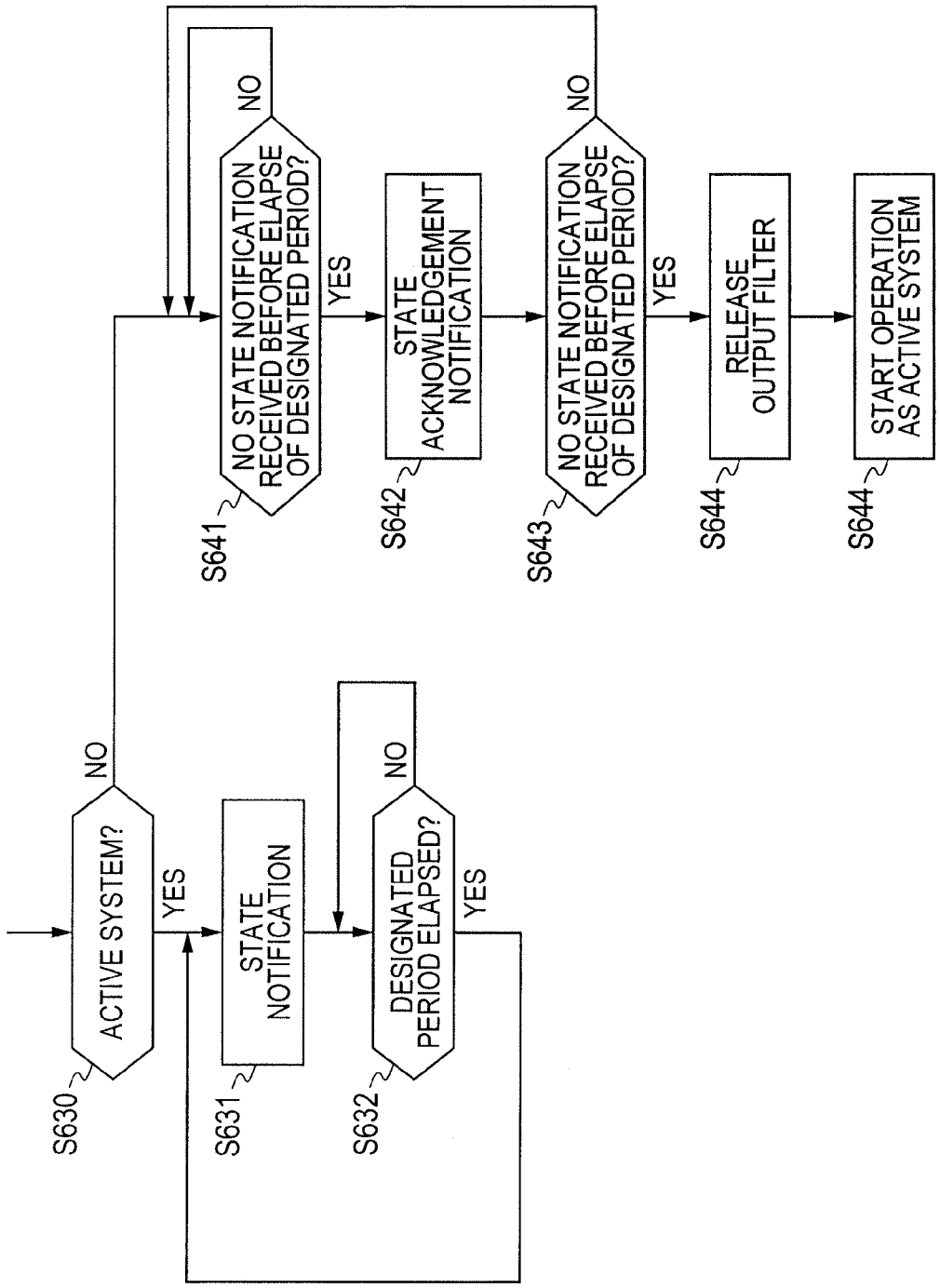
FIG. 16 is a diagram showing an example of a flowchart of the failure detection and the system switching in the network node, according to the first embodiment.

When a failure 500 occurs in the information processing unit 200-1 of the active system network node apparatus 100-1, as described using FIG. 16, since the above-described state notification packet has not been received in the designated period set with respect to the mutual monitoring processing unit 201, the information processing unit 200-2 of the standby system network node apparatus 100-2 detects it as a failure (S560).

Then, to determine whether or not it is a real failure, the information processing unit 200-2 of the standby system network node apparatus 100-2 transmits a state acknowledgement notification packet toward the information processing unit 200-1 of the active system network node apparatus 100-1 (S561). Then, when the response of the above-described state acknowledgement notification packet has not been received within the predetermined period (S562), the information processing unit 200-2 of the standby system network node apparatus 100-2 determines that the information processing unit 200-1 of the active system network node apparatus 100-1 is at a halt. The selective output halt processing unit 201 of the standby system information processing unit 200-2 releases the packet output halt with the filter of the output filter 216 (226) (S563), and an operation as an active system is started.

Figure 12:
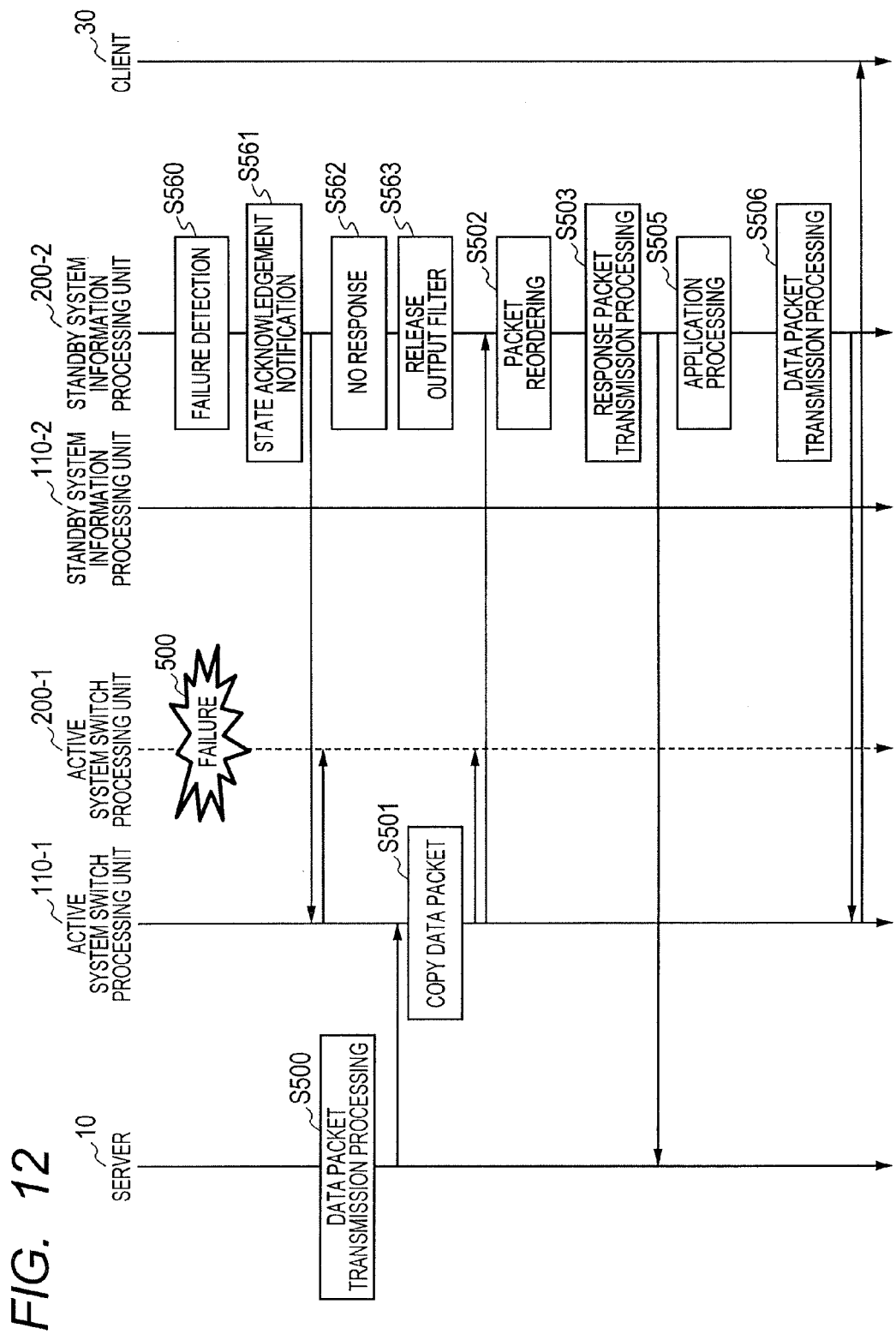
FIG. 12 is a diagram showing an example of a flowchart upon occurrence of a failure in the active system in FIG. 8, according to the first embodiment.
Figure 13:
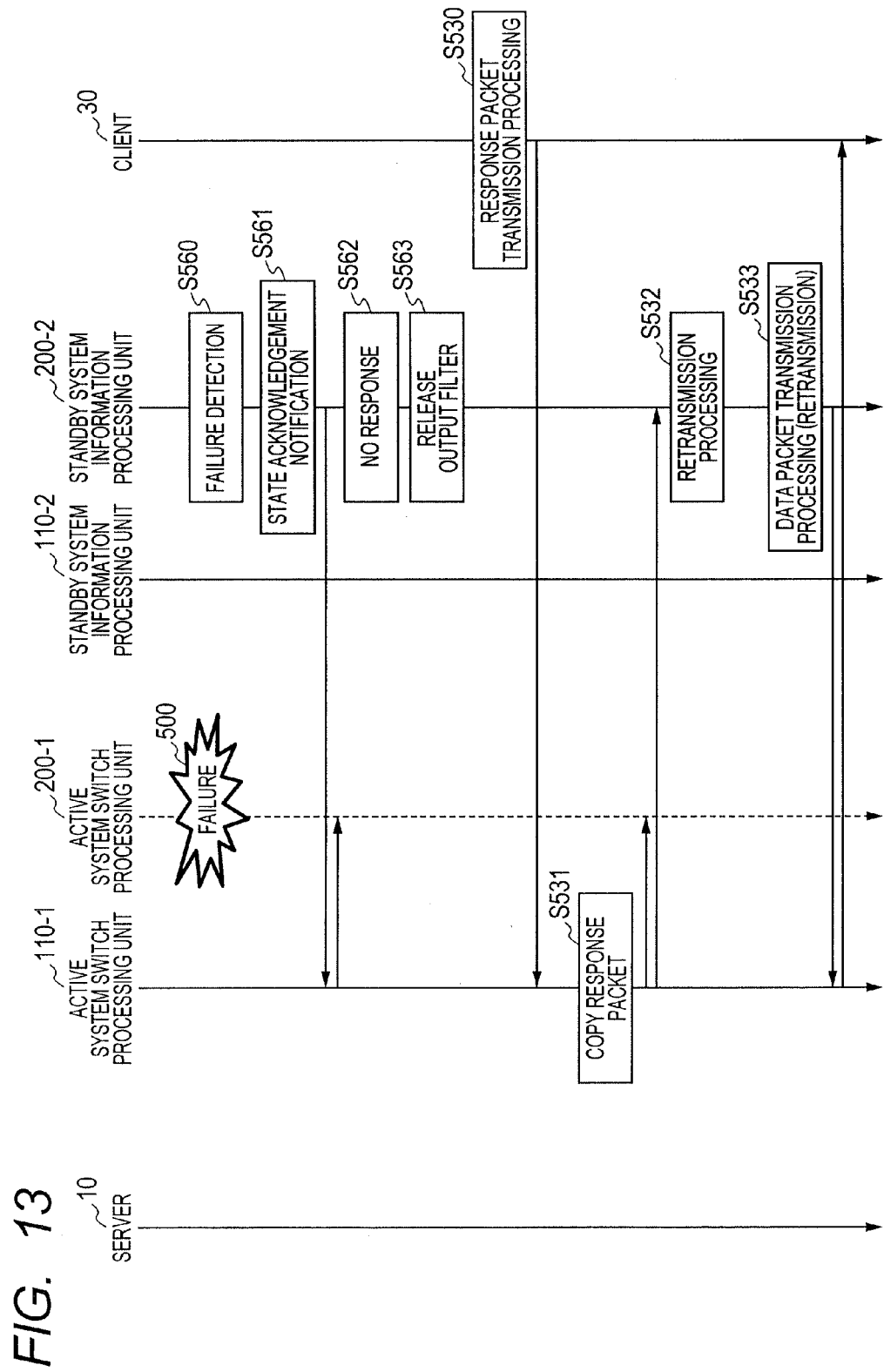
FIG. 13 is a diagram showing an example of a flowchart upon occurrence of a failure in the active system in FIG. 9, according to the first embodiment.

Next, a cooperative operation between the active system network node apparatus 100-1 and the standby system network node apparatus 100-2 when a failure occurs in the information processing unit 200-1 of the active system network node apparatus 100-1 will be described using FIG. 11, FIG. 12 and FIG. 13.

First, communication processing when a failure occurs in the active system in FIG. 7 will be described using FIG. 11. As described in FIG. 10, when the failure 500 occurs in the active system network node apparatus, the information processing unit 200-2 of the standby system network node apparatus 100-2 performs the failure detection S560, the state acknowledgement notification S561, the no-response acknowledgement S562, and the output filter release S563, and starts an operation as an active system.

At this time, at S500, the data packet transmitted from the server 10 is copied with the switch processing unit 110-1 of the active system network node apparatus 100-1 (S501), then transferred to the active system information processing unit 200-1 and the standby system information processing unit 200-2. However, since the active system information processing unit 200-1 is down due to the failure, only the standby system information processing unit 200-2 performs the packet reordering S502 and the response packet output processing S503 including a retransmission request. Note that as the output filter of the standby system information processing unit 200-2 is released, the response packet from here is transferred to the server 10.

This is the same as the communication session performed between the server 10 and the active system information processing unit 200-1 before occurrence of failure. Even when it is replaced with communication between the server 10 and the standby system network node apparatus 100-2, the same communication session and information processing are continued.

Note that upon system switching, the same packet may be temporarily transmitted from the active system information processing unit 200-1 and the standby system information processing unit 200-2. However, there is no problem since the subsequent packet is abandoned in the receiving side server 10. Further, the communication from the standby system information processing unit 200-2 which has started the operation as an active system may disappear due to lateness of output filter release. However, there is no problem since it is determined that a response in an expected order has not been received and the processing at S500 and S501 is repeated.

Next, communication processing when a failure occurs in the active system in FIG. 8 will be described using FIG. 12. As described in FIG. 10, when the failure 500 occurs in the active system network node apparatus, the information processing unit 200-2 of the standby system network node apparatus 100-2 performs the failure detection S560, the state acknowledgement notification S561, the no-response acknowledgement S562 and the output filter release S563, and starts an operation as an active system.

Figure 11:
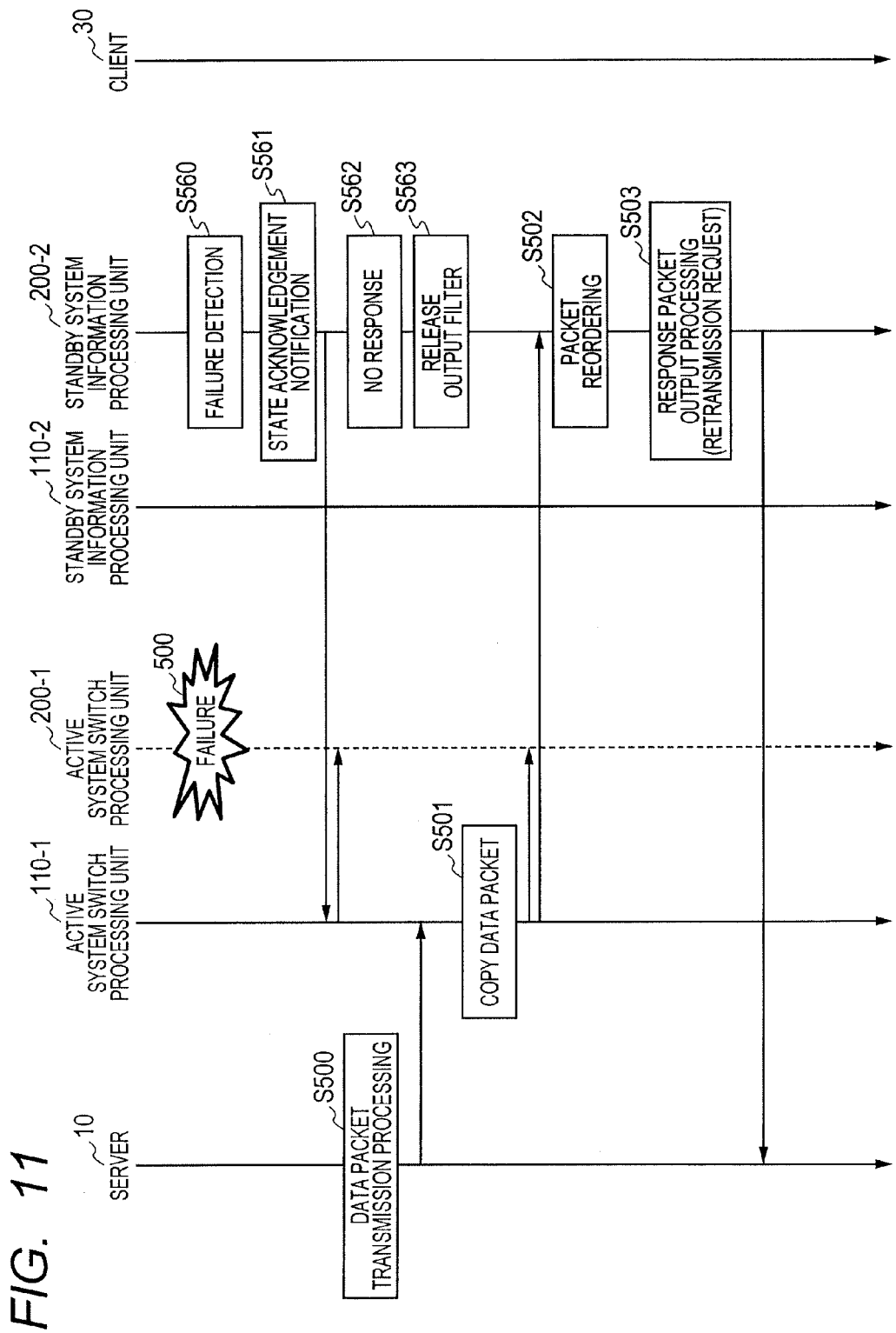
FIG. 11 is a diagram showing an example of a flowchart upon occurrence of a failure in the active system in FIG. 7, according to the first embodiment.

As in the case of the description in FIG. 11, at this time, at S500, the data packet transmitted from the server 10 is copied with the switch processing unit 110-1 of the active system network node apparatus 100-1 (S501), thereafter, transferred to the active system information processing unit 200-1 and the standby system information processing unit 200-2. However, since the active system information processing unit 200-1 is down due to the failure, only the standby system information processing unit 200-2 which has started the operation as an active system performs the packet reordering S502 and the response packet transmission processing to notify appropriate data packet reception (S503). Note that as the output filter of the standby system information processing unit 200-2 is released, the response packet from the standby system information processing unit 200-2 is transferred to the server 10.

Thereafter, the standby system information processing unit 200-2 which has started the operation as an active system transfers the data via the receive buffer 212 (222) to the application processing unit 240, to perform the application processing (S505).

The data after the application processing is subjected to the transmission processing as a data packet via the transmission buffer 224 (214) in the opposite direction to the reception (S506). At this time, since the output filter is released, the standby system information processing unit 200-2 which has started the operation as an active system can perform data packet transmission to the client 30 in place of the previous active system information processing unit 200-1.

The above-described packet transfer, i.e., communication session is the same as the communication session performed among the server 10, the client 30 and the active system information processing unit 200-1 before the occurrence of failure. Even when it is replaced with the communication among the standby system network node apparatus 100-2 which has started the operation as an active system, the server 10 and the client 30, the same communication session and information processing are continued.

Next, communication processing when a failure occurs in the active system in FIG. 9 will be described using FIG. 13. As described in FIG. 10, when the failure 500 occurs in the active system network node apparatus, the information processing unit 200-2 of the standby system network node apparatus 100-2 performs the failure detection S560, the state acknowledgement notification S561, the no-response acknowledgement S562 and the output filter release S563, and starts an operation as an active system.

The client 30 which has received the data packet transmits a response packet toward the active system network node apparatus 100-1 (S530). The active system network node apparatus 100-1 which has received the above-described response packet copies the response packet and transfers it toward the active system information processing unit 200-1 and the standby system network node apparatus 100-2 using the switch processing unit 110-1, independently of the destination IP address and the destination MAC address described in the response packet (S531).

Note that since the active system information processing unit 200-1 is down due to the failure, only the standby system information processing unit 200-2 which has started the operation as an active system can perform processing with respect to the above-described copied and transferred packet.

When the above-described response packet is a retransmission request, the standby system information processing unit 200-2 which has started the operation as an active system performs retransmission processing to send the corresponding data packet, and transmits the data packet toward the client 30 again (S532→S533). At this time, since the output filter is released, the standby system information processing unit 200-2 which has started the operation as an active system can perform data packet transmission to the client 30 in place of the previous active system information processing unit 200-1.

When the above-described response packet is a response packet notifying appropriate data packet reception, the standby system information processing unit 200-2 which has started the operation as an active system does not perform the retransmission processing S532, but performs deletion of the corresponding data packet from the transmission buffer 224 (214).

This is the same as the communication session performed between the client 30 and the active system information processing unit 200-1 before the occurrence of failure. Even when it is replaced with the communication between the standby system network node apparatus 100-2 which has started the operation as an active system and the client 30, the same communication session and information processing are continued.

Note that upon system switching, the same packet may be temporarily transmitted from the active system information processing unit 200-1 and the standby system information processing unit 200-2. However, there is no problem since the subsequent packet is abandoned in the receiving side client 30. Further, the communication from the standby system information processing unit 200-2 which has started the operation as an active system may disappear due to lateness of output filter release. However, there is no problem since it is determined that an expected response has not been received and the processing from S530 is repeated.

As described above, the cooperative operation between the active system network node apparatus 100-1 and the standby system network node apparatus 100-2 when a failure occurs in the information processing unit 200-1 of the active system network node apparatus 100-1 has been described. According to the present embodiment, even when system switching after failure occurs, communication processing and information processing the same as those before the failure can be continued.

Further, after the occurrence of failure in the active system information processing unit 200-1, as non-redundant state (single system) operation is performed only with the standby system information processing unit 200-2, it is desirable to quickly change the corresponding information processing unit 200-1 to a normal unit. Once the change has been completed, the changed information processing unit 200-1 may start an operation as a standby system.

Regarding the communication processing and information processing started after this change, when a failure occurs in the standby system information processing unit 200-2 which operates as an active system, the processing continuation can be realized by system switching to set the active system information processing unit 200-1 which operates as a standby system as an active system again by the same procedure as that described above.

Embodiment 2

In the embodiment 2, an example of a method for attaining improvement in processing efficiency and protection of significant processing as a system will be described.

According to the method described in the embodiment 1, in the active system information processing unit 200-1 and the standby system information processing unit 200-2, to perform the same information processing and communication processing, when two information processing units 200 are regarded as one system, the system use efficiency is 50%.

Then, in the embodiment 2, the concept of priority is provided for the handled communication processing and information processing. Regarding significant processing with highly-set priority, the active system and the standby system both operate so as to continue processing even upon occurrence of failure in one system. Best-effort processing with low-set priority is performed with only one system. The protection of significant processing and processing efficiency beyond 50% are attained with the operation of the present embodiment.

Figure 3:
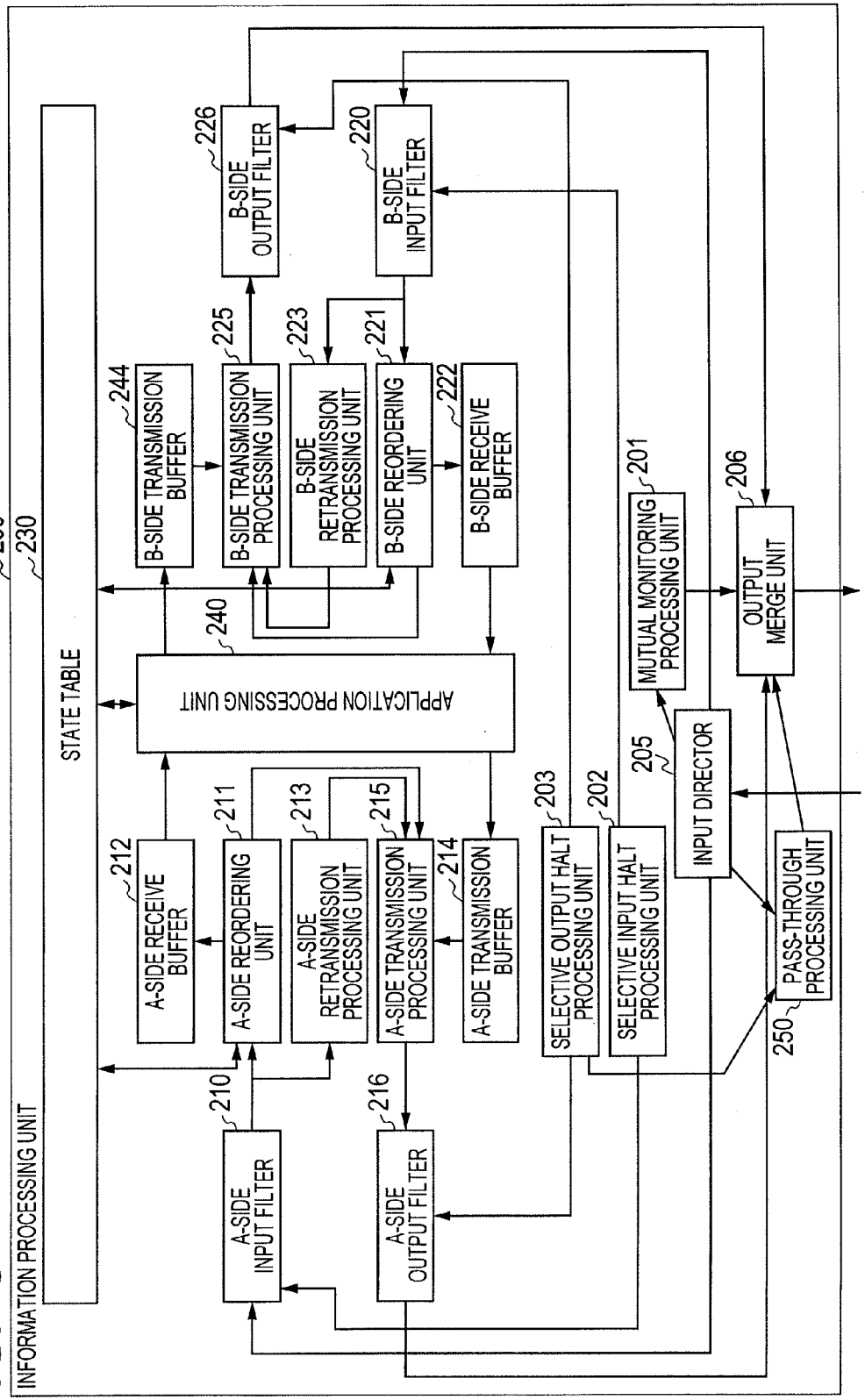
FIG. 3 is a diagram showing a configuration example of an information processing unit, according to the first embodiment.

In the present embodiment, to realize this system, the following settings are made with respect to the A-side input filter 210 and the B-side input filter 220, using the selective input halt processing unit 202 shown in FIG. 1 and FIG. 3, and with respect to the A-side output filter 216 and the B-side output filter 226 also using the selective output halt processing unit 203 shown in FIG. 1 and FIG. 3. In the present embodiment, the input filters 210 and 220 shown in FIG. 3 have an input filter table 400 shown in FIG. 17.

As shown in FIG. 17, the input filter table 400 has search key 401 and priority 402 fields. As an initial setting for the above-described system, the search key 401 is set by combination of 5-tuple information of the like, and a packet flow group of corresponding processing is classified into a high-priority packet flow H and a low-priority packet flow L. Further, with respect to the packet flow defined as a low-priority flow L, a packet flow handled only with the active system information processing unit 200-1 is classified as a packet flow LA for the sake of convenience. Similarly, a packet flow handled only with the standby system information processing unit 200-2 is classified as a packet flow LS for the sake of convenience. These classification results are set in the priority 402.

Then, as processing with respect to the input side of the information processing unit 200, the input filter 210 (220) of the active system information processing unit 200-1, is set so as to filter the packet flow LS, to eliminate input of the packet flow LS to the reordering unit 211 (221) and the retransmission processing unit 213 (223). The other high-priority packet flow H and packet flow LA are inputted.

Similarly, the input filter 210 (220) of the standby system information processing unit 200-2 is set so as to filter the packet flow LA, to eliminate input of the packet flow LA to the reordering unit 211 (221) and the retransmission processing unit 213 (223). The other high-priority packet flow H and packet flow LS are inputted.

Next, as processing with respect to the output side of the information processing unit 200 in the embodiment 2, the output filter 216 (226) of the standby system information processing unit 200-2 will be described using FIG. 18. The output filter 216 (226) has an output filter table 410 shown in FIG. 18. As in the case of the input filter table 400, the output filter table 410 has search key 411 and priority 412 fields. The values of the search key 411 and the priority 412 set in the output filter table 410 are identical to the search key 401 and the priority 402 in the input filter table 400.

In the output filter 216 (226), using this output filter table 410, the output of the high-priority packet flow H, from the input high-priority packet flow H and low-priority packet flow LS, is filtered and halted. On the other hand, the output of the low-priority packet flow LS is not filtered.

Further, when a failure occurs in the active system information processing unit 200-1 and the standby system information processing unit 200-2 operates as an active system, in its output filter 216 (226), the output filter with respect to the output-halted high-priority packet flow H, which has halted output by that time, is released. With this operation, both of the high-priority packet flow H and the low-priority packet flow LS are outputted from standby system information processing unit 200-2 which has started the operation as an active system. The other operations and processing are the same as those in the embodiment 1.

Here the use efficiency of the information processing unit 200 in the present embodiment as a system will be described. First, it is assumed that the ratio of the above-described packet flow LA and that of the packet flow LB are the same. At this time, when the ratio, high-priority packet flow H:low-priority packet flow L, handled with the respective information processing units 200 in the active system and the standby system, is 1:9, as an overlapped part is only the high-priority packet flow H as a system, processing efficiency of 10%/2+90%=95% can be realized.

Similarly, when the ratio, high-priority packet flow H:low-priority packet flow L, handled with the respective information processing units 200 in the active system and the standby system, is 2:8, the efficiency is 20%/2+80%=90%; when the ratio is 3:7, 30%/2+70=85%; when the ratio is 4:6, 40%/2+60%=80%; and when the ratio is 5:5, 50%/2+50%=75%. Note that when the ratio is 10:0, i.e., all the flows are handled as high-priority packet flows H, the efficiency is 100%/2+0%=50%, and similar use efficiency to that of the embodiment 1 is attained.

With the above-described setting and processing, regarding significant processing with highly-set priority, the active system and the standby system both operate so as to continue processing even upon occurrence of failure in one system. Regarding best-effort processing with low-set priority, it is performed with only one system. As a system, processing efficiency beyond 50% and the protection of significant processing can be attained.

Embodiment 3

Figure 19:
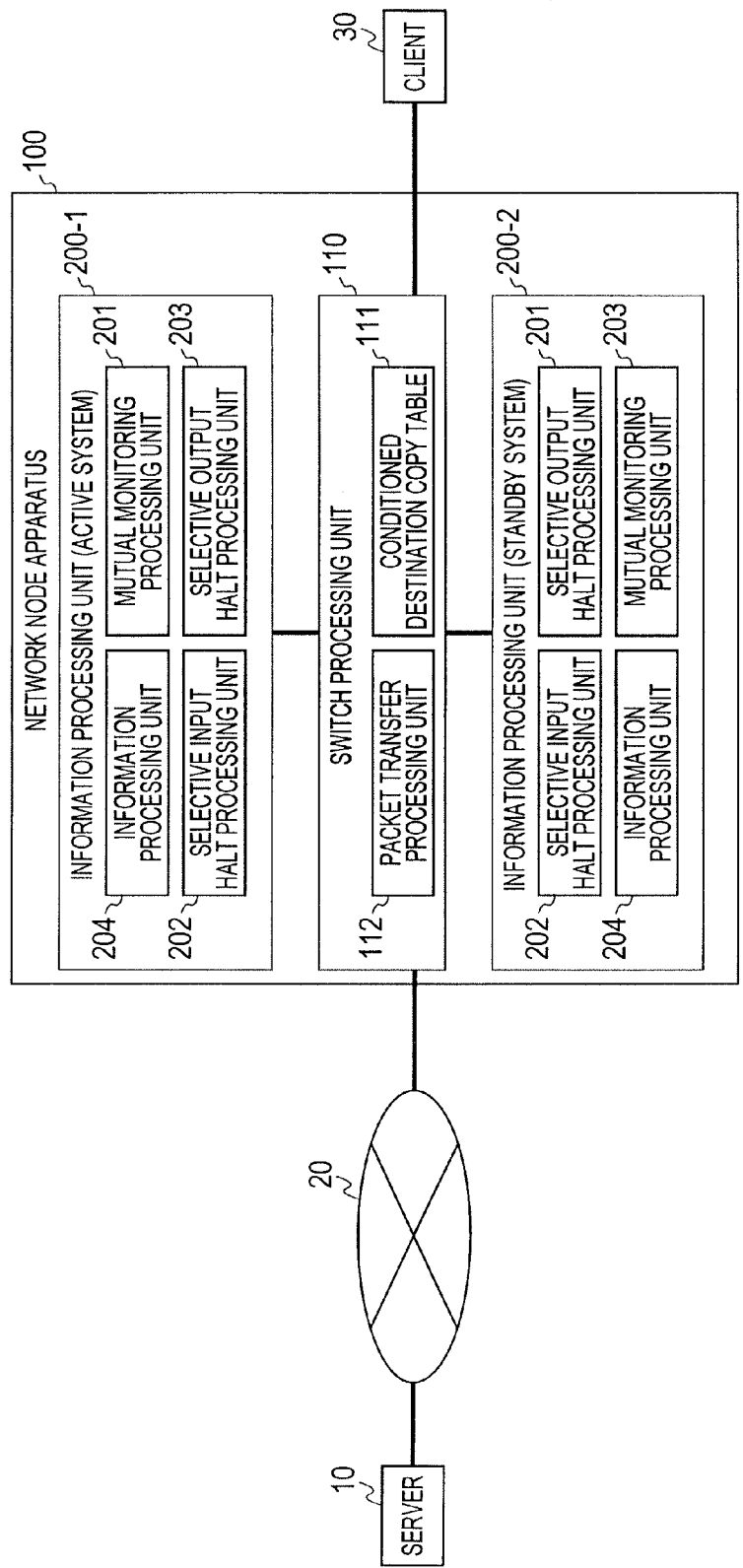
FIG. 19 is a diagram showing an example of arrangement of active system and standby system information processing units in the same network node, according to a third embodiment.

In an embodiment 3, as shown in FIG. 19, a structure in which active system information processing unit 200-1 and the standby system information processing unit 200-2 are provided in the same network node apparatus 100 will be described. The difference of the present configuration from the embodiment 1 is that an element corresponding to the standby system network node apparatus 100-2 in FIG. 1 and its switch processing unit 110-2 do not exist.

By designating the active system information processing unit 200-1 as an output port 1 (320) of the above-described conditioned destination copy table 111, and designating the standby system information processing unit 200-2 as an output port 2 (321), it is possible to copy-transfer a corresponding packet flow to both of the active system information processing unit 200-1 and the standby system information processing unit 200-2 and process the packet.

The operations of the active system information processing unit 200-1 and the standby system information processing unit 200-2 are the same as those described in the embodiment 1. The feature of the present structure is that information processing in a physically single network node apparatus 100 can be redundantized.

As a modification of the present embodiment, the embodiment 1 and the embodiment 3 may be combined. That is, the active system network node apparatus 100-1 is provided with two information processing units 200 as in the case of FIG. 17, and the standby system network node apparatus 100-2 provided with the information processing unit 200-2 is provided as in the case of FIG. 1.

In the above-described structure, the conditioned destination copy table 111 in the switch processing unit 110-1 of the active system network node apparatus 100-1 is set as follows. That is, with respect to some packet flow group A, the active system information processing unit 200-1 is designated as the output port 1 (320), and the standby system network node apparatus 100-2 is designated as the output port 2 (321). Further, with respect to another packet flow group B, the active system information processing unit 200-1 is designated as the output port 1 (320), and the standby system information processing unit 200-2 is designated as the output port 2 (321).

With this designation, it is possible to copy-transfer the corresponding packet flow group A to both of the active system information processing unit 200-1 and the information processing unit 200-2 of the standby system network node apparatus 100-2 (corresponding to FIG. 1) and perform processing. Similarly, it is possible to copy-transfer the corresponding packet flow group B to both of the active system information processing unit 200-1 in the active system network node apparatus 100-1 and the standby system information processing unit 200-2 (corresponding FIG. 19) to perform processing.

When a failure occurs in the active system information processing unit 200-1, corresponding information processing and communication processing can be continued with the information processing unit 200-2 (corresponding to FIG. 1) of the standby system network node apparatus 100-2 and the standby system information processing unit 200-2 (corresponding to FIG. 19) in the active system network node apparatus 100-1.

Note that in the present embodiment, the active system information processing unit 200-1 and the standby system information processing unit 200-2 are provided in the same network node apparatus 100. Further, it may be arranged such that an information processing unit having functions of the active system information processing unit 200-1 and the standby system information processing unit 200-2 is provided in the network node apparatus 100.

Embodiment 4

Figure 20:
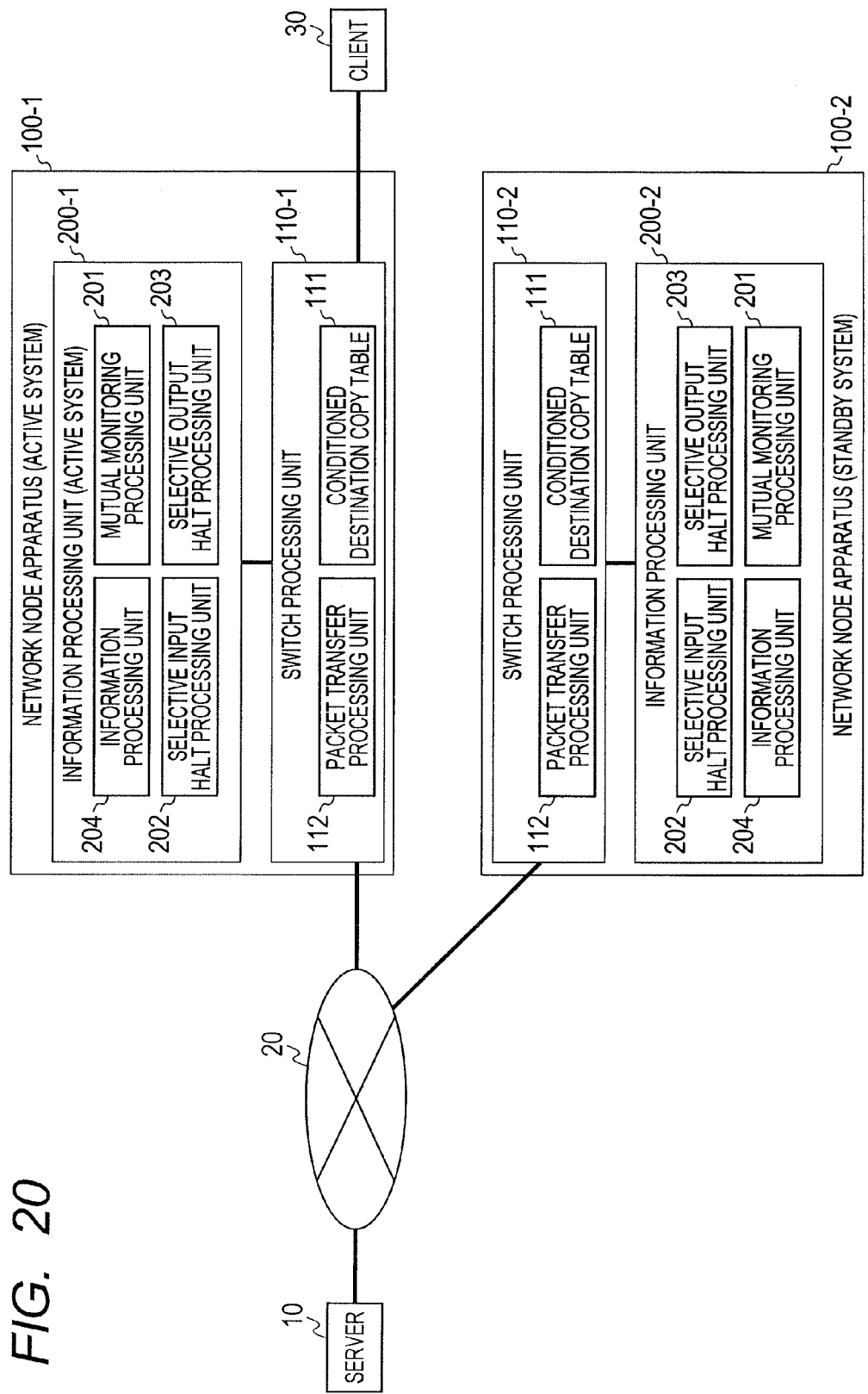
FIG. 20 is a diagram showing an example of arrangement of the active system network node and the standby system network node over a network, according to a fourth embodiment.

In an embodiment 4, a structure having the active system network node apparatus 100-1 and the standby system network node apparatus 100-2 via a WAN 20 as shown in FIG. 20, will be described.

In the case of the structure of the embodiment 4, the active system switch processing unit 110-1 performs inspection as to whether or not a packet received from a network outside the apparatus is a subject of information processing. When the packet is a subject of information processing, the packet is copied using the conditioned destination copy table 111. One packet is transmitted to the active system information processing unit 200-1 as in the case of the embodiment 1.

The other packet is transmitted to the packet transfer processing unit 112 of the active system switch processing unit 110-1 again. Here the corresponding packet is encapsulated such that the source IP address indicates the active system network node apparatus 100-1, the destination IP address indicates the standby system network node apparatus 100-2, and the protocol number is a number to designate indication of communication between the above-described apparatuses, and is transmitted to the WAN 20.

When the above-described encapsulated packet arrives at the standby system network node apparatus 100-2, the packet transfer processing unit 112 of the switch processing unit 110-2 performs decapsulation, and transfers the packet to the standby system information processing unit 200-2. The processing by the active system information processing unit 200-1 and that by the standby system information processing unit 200-2 are the same as those in the embodiment 1.

When a failure occurs in the active system information processing unit 200-1, as in the case of the embodiment 1, the packet output from the standby system information processing unit 200-2 is validated. At this time, the packet is encapsulated such that the source IP address indicates the standby system network node apparatus 100-2, the destination ID address indicates the active system 100-1, and the protocol number is a number to designate indication of communication between the above-described two apparatuses, and is transmitted to the WAN 20.

When the encapsulated packet arrives at the active system network node apparatus 100-1, the packet transfer processing unit 112 of the switch processing unit 110-1 performs decapsulation, and transfers the packet to the initial destination described in the packet.

With the above-described processing, it is possible to provide, in the structure having the active system network node apparatus 100-1 and the standby system network node apparatus 100-2 via the WAN 20, a means for continuing processing with the standby system information processing unit 200-2 even when a failure occurs in the active system information processing unit 200-1.

Note that the present invention is not limited to the above-described embodiments, however, various modifications are included. For example, the above-described embodiments have been described in detail for deeper understanding of the present invention, and not necessarily limited to an embodiment having all the described elements.

Further, it is possible to replace a part of the elements of an embodiment with those of another element. Further, it is possible to add elements of an embodiment to elements of another embodiment. Further, it is possible to perform addition/deletion/replacement on a part of the elements of the respective embodiments with other elements.

Further, as described above, it goes without saying that a part or all of the respective elements, functions, processing units and the like in the respective embodiments may be realized with hardware by e.g. designing of an integrated circuit, or may be realized with software executed with a processor or the like by generating a program to realize a part or all of them.

REFERENCE SIGNS LIST

10 server
20 WAN
30 client
100 network node apparatus
110 switch processing unit
200 information processing unit
111 conditioned destination copy table
112 packet transfer processing unit
201 mutual monitoring processing unit
202 selective input halt processing unit
203 selective output halt processing unit
230 state table
240 application processing unit
400 input filter table
410 output filter table
410 processing
420 data

The invention claimed is:

1. A network node apparatus system, comprising:
a plurality of network node apparatuses of an active system and a standby system, each of the active system and the standby system including:
a switch processing unit embodied in an integrated circuit that performs packet transfer processing for a packet received from a server; and
an information processing unit embodied in an integrated circuit that executes an information processing to the packet, both of the active system and the standby system being in an operating state,
wherein the switch processing unit of the active system comprises a transfer processing unit embodied in an integrated circuit, the switch processing unit of the active system, copies and transmits the packet and a copy of the packet to two output destinations, wherein the packet to be a subject of the information processing by an application in the information processing unit of the active system and the copy of the packet to be a subject of information processing by the standby application in the information processing unit of the standby system, so as to transfer the packet to the information processing unit of the active system and the copy of the packet to the information processing unit of the standby system, and be able to receive the packet which is information processed by the application in the information processing unit of the active system and the copy of the packet which is information processed by the application in the information processing unit of the standby system from the two output destinations,
wherein each of the information processing unit of the active system and the information processing unit of the standby system comprise: a mutual monitoring processing unit embodied in an integrated circuit that checks mutual operation states between the information processing unit of the active system and the information processing unit of the standby system, and causes the information processing unit of the standby system to operate as the active system when a failure occurs in the information processing unit of the active system,
wherein each of the information processing unit of the active system and the information processing unit of the standby system comprise: a halt processing unit embodied in an integrated circuit, wherein the halt processing unit of the standby system is configured to halt output of information of the copy of the packet processed by the application of the standby system, from the information processing unit of the standby system;
wherein the switch processing unit of the active system further comprises: at least two communication lines connected to at least two external networks, and
wherein the information processing unit of the active system comprises:
an application processing unit embodied in an integrated circuit that executes the application of the active system;
a first response acknowledgement type communication protocol processing unit embodied in an integrated circuit or software executed with a processor that is placed between one of the at least two communication lines and the application processing unit; and
a second response acknowledgement type communication protocol processing unit embodied in an integrated circuit that is placed between another one of the at least two communication lines and the application processing unit, and wherein, when the packet is transferred from the first response acknowledgement type communication protocol processing unit to the second response acknowledgement type communication protocol processing unit, a new sequence number is obtained by adding a certain value to a value of a sequence number of the packet or subtracting the certain value from the value of the sequence number of the packet, and each of the information processing unit of the active system and the information processing unit of the standby system update a sequence number of respective packet flows of the active system and the standby system by adding the certain value to a value of the sequence number of the respective packet flows of the active system and the standby system or subtracting the certain value from the value of the sequence number of the respective packet flows of the active system and the standby system.

2. The network node apparatus system according to claim 1,
wherein one of the plurality of network node apparatuses of the standby system is provided adjacent to one of the plurality of network node apparatuses of the active system.

3. The network node apparatus system according to claim 1,
wherein the transfer processing unit of the switch processing unit of the active system discriminates the packet with information in a header of the packet as a search key, copies and transfers the packet and the copy of the packet to designated two output destinations independently of destination information in the header of the packet.

4. The network node apparatus system according to claim 1,
wherein state notification is performed with the mutual monitoring processing unit of the information processing unit of the active system toward the information processing unit of the standby system, and
wherein when the state notification has not been received with the mutual monitoring processing unit of the information processing unit of the standby system within a predetermined period, subsistence acknowledgement is made with respect to the information processing unit of the active system, further wherein when no response is returned from the information processing unit of the active system, packet output halt from the information processing unit of the standby system with the halt processing unit is released.

5. The network node apparatus system according to claim 1,
wherein a packet designated as a high priority packet, among packets as subjects of information processing, is processed with both of the information processing unit of the active system and the information processing unit of the standby system, and
wherein a packet designated as a low priority packet is processed with only one of the information processing unit of the active system, or the information processing unit of the standby system.

6. The network node apparatus system according to claim 5,
wherein the halt processing unit of the information processing unit of the standby system halts output of a packet designated as the high priority packet among the packets as subjects of information processing, from the information processing unit of the standby system, while does not halt output of a packet designated as the low priority packet from the information processing unit of the standby system.

7. The network node apparatus system according to claim 1,
wherein the transfer processing unit of the switch processing unit of the active system copies and transfers the packet and the copy of the packet to be a subject of information processing to arbitrary two output destinations, designates an arbitrary information processing unit of the active system and an arbitrary information processing unit of the standby system, as output destinations, by the packet and the copy of the packet respectively.

8. The network node apparatus system according to claim 1,
wherein the plurality of network node apparatuses of the active system and the standby system are provided via a network, and
wherein the switch processing unit of the active system copies the packet to be the subject of information processing, and transfers one packet to the information processing unit of the active system, and encapsulates another packet, with one of the plurality of network node apparatuses of the standby system as a destination and with one of the plurality of network node apparatuses of the active system as an originator, and transfers the encapsulated another packet to the switch processing unit of the standby system, further wherein the switch processing unit of the standby system restores an original packet from the encapsulated packet and transfers the restored packet to the information processing unit of the standby system.

9. A network node apparatus which uses an active system and a standby system, both of the active system and the standby system being in an operating state, the network node apparatus comprising:
a switch processing unit embodied in an integrated circuit that performs transfer processing for a packet received from a server;
an information processing unit of the active system embodied in an integrated circuit that executes an information processing to the packet by an active application; and
an information processing unit of the standby system embodied in an integrated circuit that executes an information processing by a standby application,
wherein the switch processing unit has a transfer processing unit embodied in an integrated circuit that, when the switch processing unit operates as a switch processing unit of the active system, copies and transmits the packet and a copy of the packet to two output destinations, wherein the packet to be a subject of information processing by the active application in the information processing unit of the active system and the copy of the packet to be a subject of information processing by the standby application in the information processing unit of the standby system, so as to transfer the packet to the information processing unit of the active system and the copy of the packet to the information processing unit of the standby system, and to be able to receive the packet which is information processed by the active application in the information processing unit of the active system and the copy of the packet which is information processed by the standby application in the information processing unit of the standby system from the two output destinations, wherein each of the information processing unit of the active system and the information processing unit of the standby system comprise: a mutual monitoring processing unit embodied in an integrated circuit that checks mutual operation states between the information processing unit of the active system and the information processing unit of the standby system, and causes the information processing unit of the standby system to operate as the active system when a failure occurs in the information processing unit of the active system, wherein each of the information processing unit of the active system and the information processing unit of the standby system comprise: a halt processing unit embodied in an integrated circuit, wherein the halt processing unit of the standby system is configured to halt output of information of the copy of the packet processed by the standby application of the standby system, from the information processing unit of the standby system;

wherein the switch processing unit comprises: at least two communication lines connected to at least two external networks, and wherein the information processing unit of the active system comprises:

an application processing unit embodied in an integrated circuit that executes the active application of the active system;

a first response acknowledgement type communication protocol processing unit embodied in an integrated circuit that is placed between one of the at least two communication lines and the application processing unit; and a second response acknowledgement type communication protocol processing unit embodied in an integrated circuit that is placed between another one of the at least two communication lines and the application processing unit, and wherein, when the packet is transferred from the first response acknowledgement type communication protocol processing unit to the second response acknowledgement type communication protocol processing unit, a new sequence number is obtained by adding a certain value to a value of a sequence number of the packet or subtracting the certain value from the value of the sequence number of the packet, and each of the information processing unit of the active system and the information processing unit of the standby system update a sequence number of respective packet flows of the active system and the standby system by adding the certain value to a value of the sequence number of the respective packet flows of the active system and the standby system or subtracting the certain value from the value of the sequence number of the respective packet flows of the active system and the standby system.

10. The network node apparatus according to claim 9, wherein the transfer processing unit of the switch processing unit of the active system discriminates the packet with header information of the packet as a retrieval key search key, and copies and transfers the packet and a copy of the packet to designated two output destinations independently of destination information of the packet.

11. The network node apparatus according to claim 9, wherein the information processing unit of the active system performs state notification by the mutual monitoring processing unit of the active system toward the information processing unit of the standby system, and wherein when the state notification has not been received with the mutual monitoring processing unit of the active system within a predetermined period, the information processing unit of the standby system performs subsistence acknowledgement with respect to the information processing unit of the active system, and when no response is returned from the information processing unit of the active system, releases packet output halt from the information processing unit of the standby system with the halt processing unit of the standby system.

12. A communication method for using network node apparatuses of an active system and a standby system, comprising:

performing transfer processing, by a switch processing unit, for a packet received from a server; and executing information processing, by an information processing unit, to the packet by an application, both of the switch processing unit and the information processing unit being in an operating state, wherein when the switch processing unit operates as the switch processing unit of the active system, copies and transmits the packet to be a subject of information processing by the application in the information processing unit from two output destinations so as to transfer the packet to the information processing unit of the active system and the information processing unit of the standby system, and the switch processing unit to be able to receive the packet which is information processed by the application from the two output destinations, wherein the information processing unit checks mutual operation states between the information processing unit of the active system and the information processing unit of the standby system, and when a failure occurs in the active system, causes the information processing unit of the standby system to operate as the active system, and when operates as the information processing unit of the standby system, halts output of the packet which is information processed by the application from the information processing unit of the standby system, wherein the switch processing unit of the active system further comprises: at least two communication lines connected to at least two external networks, wherein the information processing unit of the active system comprises:

an application processing unit embodied in an integrated circuit that executes the application of the active system;

a first response acknowledgement type communication protocol processing unit embodied in an integrated circuit or software executed with a processor that is placed between one of the at least two communication lines and the application processing unit; and a second response acknowledgement type communication protocol processing unit embodied in an integrated circuit that is placed between another one of the at least two communication lines and the application processing unit, and wherein, when the packet is transferred from the first response acknowledgement type communication protocol processing unit to the second response acknowledgement type communication protocol processing unit, a new sequence number is obtained by adding a certain value to a value of a sequence number of the packet or subtracting the certain value from the value of the sequence number of the packet, and each of the information processing unit of the active system and the information processing unit of the standby system update a sequence number of respective packet flows of the active system and the standby system by adding the certain value to a value of the sequence number of the respective packet flows of the active system and the standby system or subtracting the certain value from the value of the sequence number of the respective packet flows of the active system and the standby system.

13. The communication method according to claim 12, wherein the switch processing unit discriminates the packet with header information of the packet as a search key, and copies and transfers the packet to designated two output destinations independently of destination information of the packet.

14. The communication method according to claim 12, wherein the information processing unit of the active system performs state notification toward the information processing unit of the standby system, and wherein when the state notification has not been received with the information processing unit of the standby system within a predetermined period, performs subsistence acknowledgement with respect to the information processing unit of the active system, and releases packet output halt from the information processing unit of the standby system when no response is returned from the information processing unit of the active system.

15. The communication method according to claim 12, wherein a packet designated as a high priority packet among packets of subjects of information processing is processed with both of the information processing unit of the active system and the information processing unit of the standby system, and wherein a packet designated as a low priority packet is processed with the information processing unit of the active system designated by packet, or the information processing unit of the standby system.

16. The communication method according to claim 15, wherein the information processing unit of the standby system halts output of the packet designated as the high priority packet, among the packets as the subjects of information processing, from the information processing unit of the standby system, and does not halt output of the packet designated as the low priority packet from the information processing unit of the standby system.

17. A network node apparatus comprising:
a switch processing unit embodied in an integrated circuit that performs packet transfer processing for a packet received from a server; and
an information processing unit embodied in an integrated circuit of an active system and an information processing unit of a standby system that execute an information processing to the packet by an application, both information processing units being used in an operating state; and
wherein the switch processing unit has a transfer processing unit that copies and transmits the packet to be a subject of the information processing by the application in the information processing unit from two output destinations, so as to transfer the packet to the information processing unit of the active system and the information processing unit of the standby system, and receive a packet from the two output destinations, wherein each of the information processing units has a mutual monitoring processing unit that checks mutual operation states between the information processing unit of the active system and the information processing unit of the standby system, and causes the information processing unit of the standby system to operate as the active system when a failure occurs in the information processing unit of the active system; and a halt processing unit that, when the information processing unit operates as the information processing unit of the standby system, halts output of the packet processed by the application from the information processing unit of the standby system;

wherein the switch processing unit has lines connected to at least two external networks; and wherein the information processing unit includes:
an application processing unit that executes the application;
a first response acknowledgement type communication protocol processing unit placed between one of the lines and the application processing unit; and
a second response acknowledgement type communication protocol processing unit placed between another one of the lines and the application processing unit, wherein, when a packet is transferred from the first response acknowledgement type communication protocol processing unit to the second response acknowledgement type communication protocol processing unit, a new sequence number is obtained by adding a certain value to a value of a sequence number of the packet or subtracting the certain value from the value of the sequence number of the packet, and each of the information processing unit of the active system and the information processing unit of the standby system update a sequence number of respective packet flows of the active system and the standby system by adding the certain value to a value of the sequence number of the respective packet flows of the active system and the standby system or subtracting the certain value from the value of the sequence number of the respective packet flows of the active system and the standby system.

18. The network node apparatus of claim 17, wherein a packet designated as a high priority packet, among packets as subjects of information processing, is processed with both of the information processing unit of the active system and the information processing unit of the standby system, and wherein a packet designated as a low priority packet is processed with only one of the information processing unit of the active system designated by packet or the information processing unit of the standby system.

\* \* \* \* \*